(12) United States Patent
Aoki et al.

(10) Patent No.: US 8,255,878 B2
(45) Date of Patent: Aug. 28, 2012

(54) PROGRAM DEVELOPMENT SUPPORT DEVICE

(75) Inventors: Kazuo Aoki, Tokyo (JP); Toshiro Matsumura, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 925 days.

(21) Appl. No.: 12/078,006

(22) Filed: Mar. 26, 2008

(65) Prior Publication Data

US 2008/0189685 A1 Aug. 7, 2008

Related U.S. Application Data

(63) Continuation of application No. PCT/JP2006/318746, filed on Sep. 21, 2006.

(30) Foreign Application Priority Data

Sep. 27, 2005 (JP) ................................ 2005-279892

(51) Int. Cl.
G06F 9/44 (2006.01)
(52) U.S. Cl. ......... 717/129; 717/106; 717/124; 717/138
(58) Field of Classification Search .................. None
See application file for complete search history.

(56) References Cited

U.S. PATENT DOCUMENTS

| | | | | |
|---|---|---|---|---|
| 5,819,094 | A * | 10/1998 | Sato et al. ...................... | 717/131 |
| 6,167,365 | A * | 12/2000 | Karthikeyan et al. ........... | 703/28 |
| 7,813,910 | B1 * | 10/2010 | Poulin .............................. | 703/22 |
| 2002/0059567 | A1 * | 5/2002 | Minamide et al. ............. | 717/151 |
| 2002/0146876 | A1 | 10/2002 | Saruwatari et al. | |
| 2002/0199005 | A1 * | 12/2002 | Schneider et al. ............. | 709/229 |
| 2003/0236657 | A1 * | 12/2003 | Ryzl ............................... | 703/23 |

(Continued)

FOREIGN PATENT DOCUMENTS

EP 0 814 404 12/1997

(Continued)

OTHER PUBLICATIONS

Yamato, Satoshi, "Cell phone 'Uhauha' programming," JAVA Developer No. 8, Mar. 1, 2003, No. 8, pp. 118-121 (with partial English translation).

(Continued)

*Primary Examiner* — Isaac Tecklu
(74) *Attorney, Agent, or Firm* — Kratz, Quintos & Hanson, LLP

(57) ABSTRACT

Via an internal bus 69, a host emulation unit 61 of a control procedure unit 60 loads a program under development into, and sends program execution control commands to, a program under development execution unit 70 which includes an engine processor. In response to these program execution control commands, the program under development execution unit 70 performs execution starting, stopping, pausing, or resumption of the program under development. On the other hand, execution mode setting information for the program under development is sent from an execution mode setting unit 62 of the control procedure unit 60 via the internal bus 69 to the program under development execution unit 70, in response to commands from the user. Based upon this execution mode setting information, the program execution operation by the engine processor is controlled by the program under development execution unit 70. As a result, during the development of a program to be executed by the engine unit of a mobile communication terminal which comprises a host unit and an engine unit which comprises an engine processor and which operates under the management of the host unit, it is possible to provide a satisfactory development environment.

5 Claims, 20 Drawing Sheets

U.S. PATENT DOCUMENTS

| | | | | |
|---|---|---|---|---|
| 2003/0237023 A1* | 12/2003 | Satoh et al. | ............... | 714/28 |
| 2004/0078671 A1* | 4/2004 | Uchino | ............... | 714/28 |
| 2004/0210433 A1* | 10/2004 | Elazar et al. | ............... | 703/24 |
| 2005/0010892 A1* | 1/2005 | McNair et al. | ............... | 717/101 |
| 2005/0193251 A1* | 9/2005 | Chuang et al. | ............... | 714/29 |
| 2005/0268195 A1* | 12/2005 | Lund et al. | ............... | 714/741 |
| 2005/0289506 A1* | 12/2005 | Renner | ............... | 717/105 |

FOREIGN PATENT DOCUMENTS

| | | |
|---|---|---|
| JP | 62-160543 | 7/1987 |
| JP | 8-202582 | 8/1996 |
| JP | 10-240565 | 9/1998 |
| JP | 2002-304310 | 10/2002 |
| JP | 2003-316603 | 11/2003 |

OTHER PUBLICATIONS

Satoh, Ichiro, "Flying Emulator: Building and Testing Software for Mobile Computing," Dec. 15, 2002, vol. 43, No. 12, pp. 3765-3774 (with English abstract).

Nakanishi, Ryusaku, "A method for creating 'i appli' by using 'i-JADE' the i appli created by the i-JADE Lite + the JBuilder," JAVA Press, Apr. 10, 2001, vol. 17, pp. 67-74 (with partial English translation).

Japanese Office Action dated Mar. 7, 2007 (in Japanese).

Extended European Search Report received in counterpart application dated Apr. 3, 2012 (7 pages).

* cited by examiner

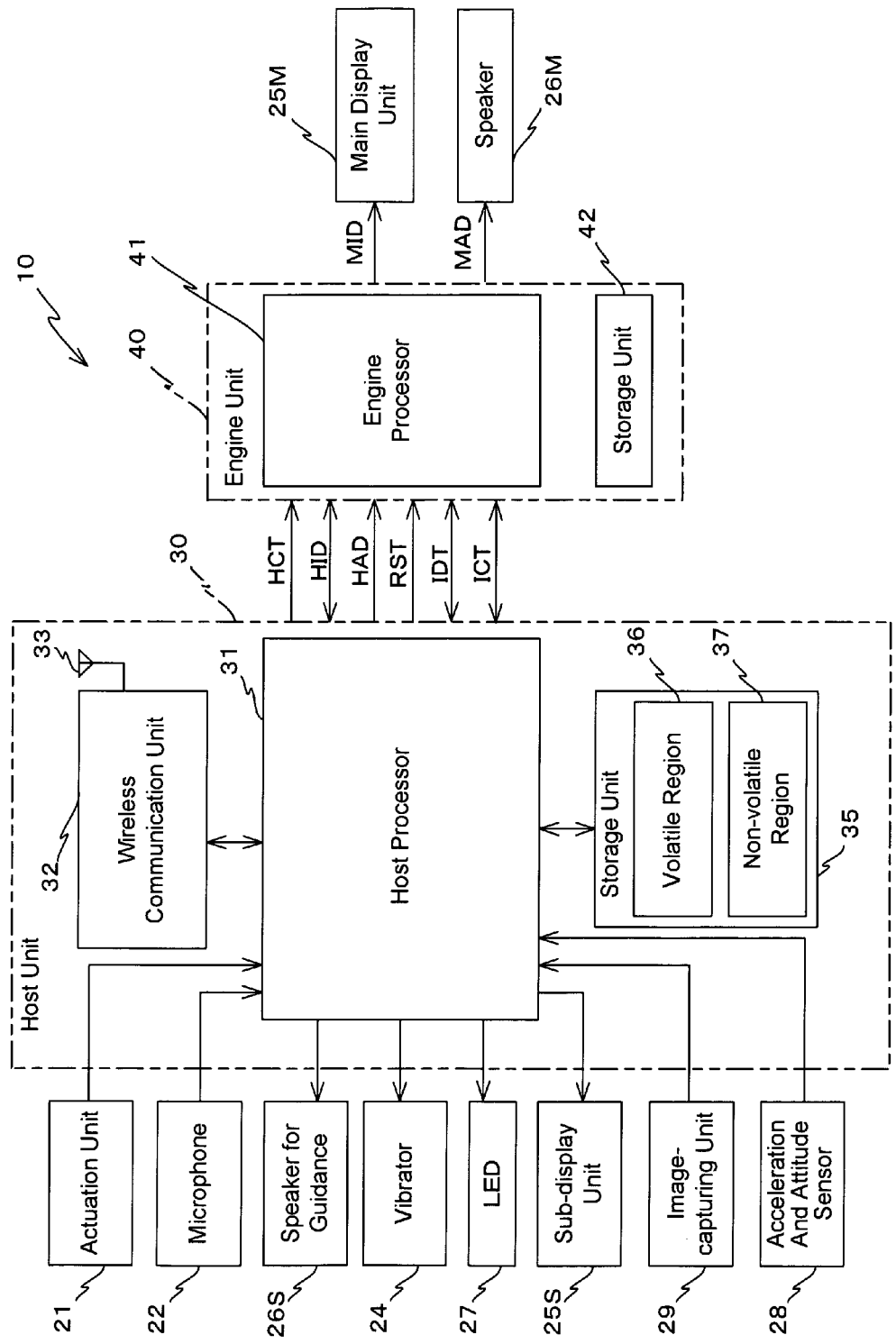

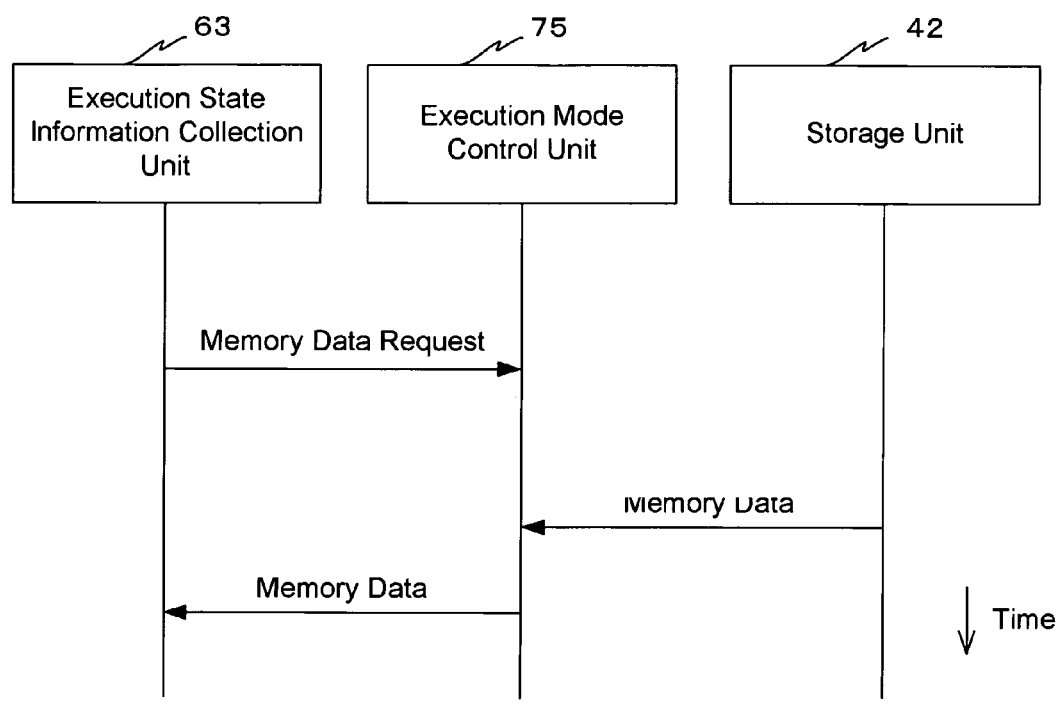

PROGRAM DEVELOPMENT SUPPORT DEVICE

RELATED APPLICATION

This is a continuation application of the international patent application No. PCT/JP2006/318746 filed with Application date: Sep. 21, 2006. The present application is based on, and claims priority from, J.P. Application 2005-279892, filed on Sep. 27, 2005, the disclosure of which is hereby incorporated by reference herein its entirety.

BACKGROUND OF THE INVENTION

The present invention relates to a program development support device, and, more particularly relates to a program development support device which, for a mobile communication terminal comprising a host unit which comprises a host processor and an engine unit which comprises an engine processor and which operates under the management of said host unit, supports the development of a program to be executed by the engine unit.

BACKGROUND ART

From the prior art, mobile communication terminal devices such as cellular phoness and the like are widely disseminated. The progress of mobile communication terminal such as cellular phones, and in particular the progress of techniques related to the cellular phone, is remarkable, and, in addition to their communication function of communicating via the mobile communication network, which is their essential function as mobile communication terminal, it has also been arranged to implement additional functionality for enjoying games and music appreciation.

With such mobile communication terminal, a processor is incorporated which performs various kinds of data processing for fulfilling the above described essential function and additional functionality. To this processor there are connected various resources, such as a storage unit which includes a storage element for storing various types of programs and data, a wireless communication unit for performing wireless communication, an actuation unit for the user to perform actuation command, a notification unit (a display output unit and/or an audio output unit) which notifies various types of information to the user, and so on. And it is arranged for the above described essential function and additional functionality to be fulfilled by the processor executing programs stored in the storage unit, and, according to requirements, performing appropriate control of the connected resources.

When performing debugging during the development of such a program, it is desirable for the program under development to be made to operate in a hardware environment which is close to that of the mobile communication terminal upon which, finally, the program will come to be executed (in the following, this is also termed the "actual terminal"). Due to this, a method (hereinafter termed the "prior art example") is generally employed of preparing a circuit board for development which has the circuit structure of the actual terminal, or one equal thereto, and of using an in-circuit emulator device which is prepared separately.

SUMMARY OF THE INVENTION

Problem to be Solved by the Invention

Now, with a prior art mobile communication terminal, a general purpose processor is employed as the internally incorporated processor, since it is necessary to fulfill various kinds of functions. This is an excellent method from the point of view of making the structure of the device simple, making it more compact, and reducing the consumption of electrical power. However it is difficult to anticipate a dramatic performance enhancement with the use of a general purpose type processor, such as the performance enhancement required for additional functionality operations in order, for example, to enjoy games or music appreciation.

When compared with other information processing devices, the requirement for performance enhancement by a mobile communication terminal may be said to be due to additional functionality operation. The additional functionality operation for which performance enhancement is demanded in this manner is, in concrete terms, the execution of games and the replaying of music and the like, but it is considered that, during this type of additional functionality operation, in particular, the screen display processing and the audio data output processing impose a large load upon the processor.

Furthermore, although there is a requirement for a mobile communication terminal to fulfill the above described essential function and additional functionality, since in principle the user is an individual, accordingly in no circumstances do the requirements go so far as to require the essential function operation and the additional functionality operation to operate simultaneously and independently. For example, the requirements do not go so far as to require game operation, which is an additional functionality operation, to be performed while also performing telephone conversation operation, which is an essential function operation.

Due to the reasons above, it has been considered to additionally provide an engine processor which excels at screen display processing and audio data output processing and which is dedicated to the additional functionality, and to execute an application program which handles the additional functionality operation upon an engine unit which comprises this engine processor, under the management of a host unit comprising a host processor, which is the processor which performs communication operation.

When this type of structure which includes a host unit and an engine unit is employed, the application program which is executed by the engine unit is developed by a so called contents provider. During this development, it is necessary for the contents provider to prepare an in-circuit emulator for the engine processor. However, this task imposes a large burden upon the contents provider.

The present invention has been made in consideration of the circumstances described above, and its object is to provide a program development support device which, for a mobile communication terminal comprising a host unit which comprises a host processor and an engine unit which comprises an engine processor and which operates under the management of said host unit, can supply a satisfactory development environment during the development of a program to be executed by the engine unit, without preparation of any in-circuit emulator device.

Means for Solving the Problem

The program development support device of the present invention is, for a mobile communication terminal comprising a host unit which comprises a host processor, and an engine unit, comprising an engine processor and a volatile storage region in which a program sent from said host unit is stored, and which performs execution of said program stored in said volatile storage region according to a program execution control command from said host unit, a program development support device which supports the development of said program to be executed by said engine unit, characterized by comprising: a control procedure unit which, along with performing emulation of said host unit, also performs setting of execution mode for the program under development; and a program under development execution unit which is connected to said control procedure unit via an internal bus, and which executes the program under development; wherein said program under development execution unit comprises: said engine processor; a volatile storage unit which is connected to said engine processor, and in which is stored said program under development, which has been sent from said control procedure unit via said internal bus; an execution mode control unit which controls the program execution mode by said engine processor for said program under development, according to execution mode setting information which has been sent from said control procedure unit via said internal bus; and a bus interface unit which performs interfacing between said internal bus, and said engine processor and said execution mode control unit.

With this program development support device, the control procedure unit performs host emulation, and sends the program under development to the program under development execution unit via the internal bus. And, upon receipt, the program under development is stored in the volatile storage unit by the program under development execution unit. It should be understood that, even in the engine unit of the mobile communication terminal upon which the program is being implemented after development has been completed, it is arranged for the program data which has been sent from the host unit to be stored in the storage unit which is constituted by the volatile storage element.

Thereafter, the control procedure unit performs host emulation, and sends program execution control commands to the program under development execution unit via the internal bus. In this manner, starting, stopping, pausing and resumption of execution of the program under development which is stored in the volatile storage region are performed by the program under development execution unit, in response to program execution control commands which are sent from the control procedure unit.

On the other hand, in response to a command from the developer, execution mode setting information for the program under development is sent via the internal bus from the control procedure unit to the program under development execution unit. In this type of execution mode setting information there may be included, for example, break point address information or command information for the execution of the program under development until a break point address, and the like.

In the program under development execution unit, the execution mode setting information is received by the execution mode control unit. Based upon this execution mode setting information, the execution mode control unit controls the operation by the engine processor to execution the program. For example, if setting information for execution of the program under development until a specified break point address has been received from the execution monitoring unit, then, when the command at the specified break point address has been executed, the execution mode control unit stops the operation of the engine processor while maintaining the states of the engine processor and of the volatile storage unit.

In other words, with the program development support device of the present invention, the program under development execution unit is built so as to include the same hardware environment as the engine unit upon which execution is performed after development of the program, which can be connected to the internal bus, and also the debugging hardware environment which is required for debugging for program development.

Furthermore, the operation of the host unit is emulated by the control procedure unit, which consists of software and the like upon the program development support device, and which is connected to the program execution unit via the internal bus. As a result, along with it being possible for the program under development to be loaded into the program under development execution unit by the developer issuing a command to the control procedure unit, it is also possible to load program execution control commands related to the program under development into the program under development execution unit.

Furthermore, by the developer issuing a command to the control procedure unit, it is possible to send execution mode setting information for the program under development to the program under development execution unit.

As a result, the developer is able to perform debugging of the program under development by issuing commands only to the control procedure unit. Thus, according to the program development support device of the present invention, during the development of a program to be executed by the engine unit of a mobile communication terminal which comprises a host unit comprising a host processor and an engine unit which comprises an engine processor and which operates under the management of the host unit, it is possible to provide a satisfactory development environment, without providing any separate in-circuit emulator device for the engine processor.

With the development support device of the present invention, when program execution operation by said engine processor has been stopped, it may be arranged for said program under development execution unit to collect state information of said engine processor, and to forward it to said control procedure unit via said internal bus as execution state information. In this case, during the stoppage of operation, the control procedure device is able to obtain the state information of the engine processor, such as the contents of various types of register within the engine processor and the like. And, by performing display or the like of the state information which has been obtained, the control procedure unit is able to supply the developer with information which is useful for program debugging, such as the state information of the engine processor during stoppage of the operation of the engine processor.

Furthermore, with the program development support device of the present invention, it may be arranged for said program under development execution unit further to include a command history reporting unit which, along with collecting commands and responses which are exchanged between said engine processor and said control procedure unit via said internal bus and storing them as command history, also sends said command history to said control procedure unit in response to a command history request from said control procedure unit. In this case, the control procedure unit is able to obtain command history consisting of commands and responses which are exchanged between the engine processor and the control procedure unit, when a requirement from the developer arises. And, by performing display or the like of this state information which has been obtained, the control procedure unit is able to supply to the developer command history information which is effective for debugging of the program under development.

Furthermore, with the program development support device of the present invention, if said program under development is an application program which performs at least one of display output and audio output, then there may be further included a screen display means which is used by said program under development during display output, and an audio replay means which is used by said program under development during audio output. In this case, it is possible to perform display output and audio output by the program under development upon a screen display means and an audio replay means which are separate from the ones which are used for display and so on by the control procedure unit, so that it is possible to provide a satisfactory debugging environment.

It should be understood that, with the program development support device of the present invention, in that said setting of execution mode, it may be arranged for there to be included a setting for execution of said program under development up to a designated break point address, and a setting for execution of a single command recorded in a program address corresponding to the present value of a program counter.

As has been explained above, according to the program development support device of the present invention, the advantageous effect is obtained that, during the development of a program to be executed by the engine unit of a mobile communication terminal which comprises a host unit comprising a host processor and an engine unit which comprises an engine processor and which operates under the management of the host unit, it is possible to provide a satisfactory development environment, without providing any separate in-circuit emulator device for the engine processor.

BRIEF DESCRIPTION OF DRAWINGS

FIG. 2 is a block diagram for explanation of the internal structure of the cellular phone of FIGS. 1A through 1C;

FIG. 20 is a sequence diagram for explanation of processing for reading out the memory contents within the engine unit.

DETAILED DESCRIPTION

First a cellular phone 10, which is a mobile communication terminal upon which will finally be implemented an application program (hereinafter simply termed an "application") which has been developed using a program development support device 100 (refer to FIG. 5) according to one embodiment of the present invention, which will be described hereinafter, will be explained with reference to FIGS. 1A through 4.

Figure 1C:
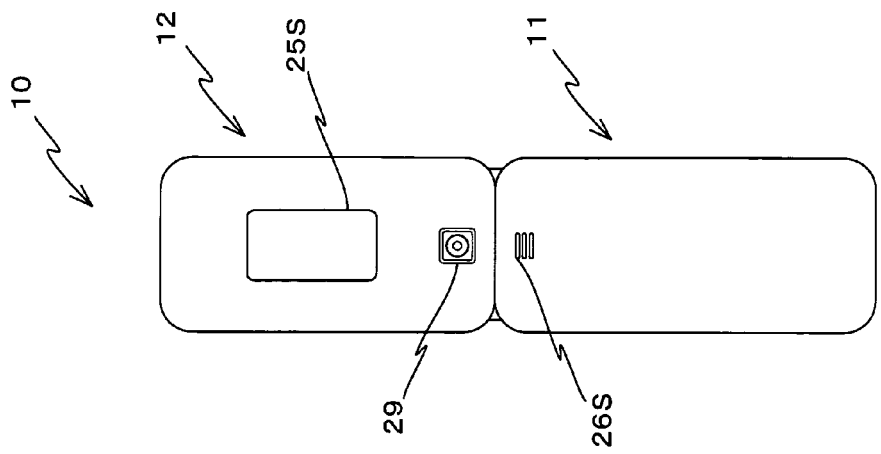
FIG. 1C is a rear view schematically showing the external appearance of this cellular phone upon which the program which has been developed using the program development support device according to an embodiment will finally be implemented.
Figure 1B:
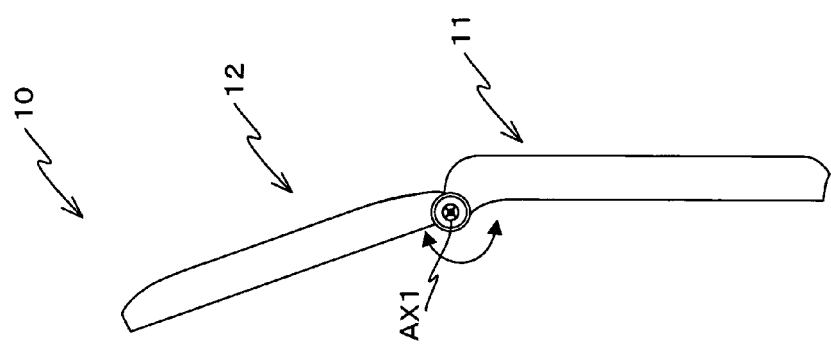
FIG. 1B is a right side view schematically showing the external appearance of this cellular phone upon which the program which has been developed using the program development support device according to an embodiment will finally be implemented.
Figure 1A:
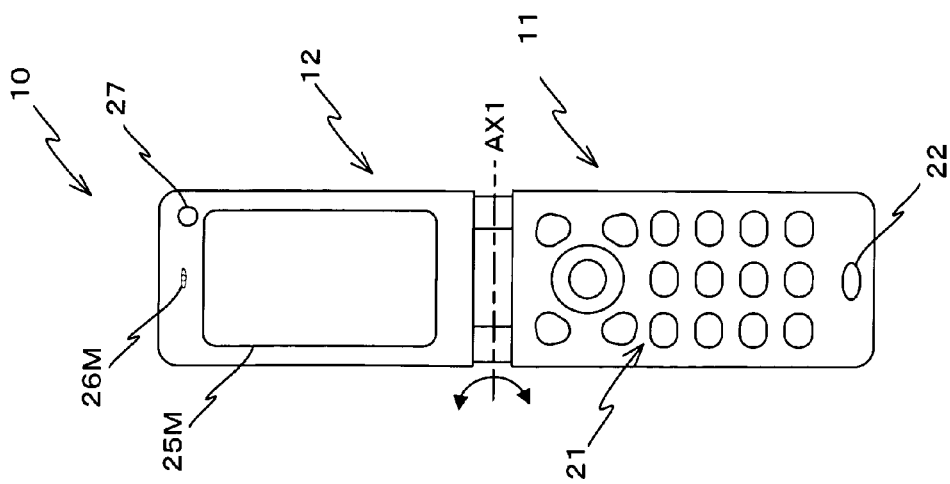
FIG. 1A is an elevation view schematically showing the external appearance of a cellular phone upon which a program which has been developed using a program development support device according to an embodiment will finally be implemented.

The structure of this cellular phone is schematically shown in FIGS. 1A through 1C and FIG. 2. Here, an elevation view of the external appearance of the cellular phone 10 in its opened up state is shown in FIG. 1A, a right side view of the external appearance of the cellular phone 10 in its opened up state is shown in FIG. 1B, and a rear view of the external appearance of the cellular phone 10 in its opened up state is shown in FIG. 1C. Furthermore, the functional block structure of the cellular phone 10 is shown in FIG. 2.

As shown in FIG. 1, this cellular phone 10 comprises a first portion 11 and a second portion 12 which is rotatable around an axis AX1 with respect to said first portion 11.

As shown in FIG. 1A, in the first portion 11, there are disposed: (a) an actuation unit 21 upon which are arrayed a ten key pad and actuation keys such as function keys and the like; and (b) a microphone 22 for inputting audio during telephone conversation. Furthermore, as shown in FIG. 1C, on the rear surface when the surface of the first portion 11 upon which the actuation unit 21 is disposed is facing to the front, there is disposed (c) a speaker for guidance 26S for emitting ring tones and guidance sounds.

As shown in FIG. 1A, on the second portion 12, there are disposed (a) a main display unit 25M which displays actuation guidance, operational states, received messages, image capture results from an image capturing unit 29 which will be described hereinafter, and images and the like from an engine application; (b) a speaker 26M which replays audio signals sent from the opposite party to communication during telephone conversation; (c) a LED (Light Emitting Diode) 27 for attracting the attention of the user. Moreover, as shown in FIG. 1C, upon the rear surface when the display surface of the second portion 12 which bears the main display unit 25M is facing to the front, there are disposed (d) a sub-display unit 25S which performs auxiliary display; and (e) an image capturing unit 29 which captures an image within the field of view of an imaging optical system.

Furthermore, as shown in FIG. 2, the cellular phone 10 also comprises (f) a vibrator 24 for vibrating the cellular phone 10 when a signal arrives and thus notifying the user of this signal arrival; and (g) an acceleration and attitude sensor 28 for detecting the acceleration which acts upon the cellular phone 10 and the attitude of the cellular phone 10. This vibrator 24 and acceleration and attitude sensor 28 are disposed internally to the cellular phone 10.

Furthermore, this cellular phone 10 comprises (j) a host unit 30 for providing its basic functions as a cellular phone, such as communication functions and the like; and (k) an engine unit 40 which performs execution of engine applications. This host unit 30 and engine unit 40 are disposed internally to the cellular phone 10.

The host unit 30 comprises a host processor 31 which performs overall control of the cellular phone 10 as a whole, a wireless communication unit 32 for performing transmission and reception of communication signals via an antenna 33, and a storage unit 35 which stores programs and data. The above described actuation unit 21, microphone 22, speaker for guidance 26S, LED 27, sub-display unit 25S, and vibrator 24 are all connected to the host processor 31.

The host processor 31 is endowed with the function of a central processing unit (CPU) and with the function of a digital signal processor (DSP). And, by reading out and executing a program for host 38 (refer to FIG. 3) which is stored in the storage unit 35, this host processor 31 performs basic function operations such as the communication function operation and so on, and exchange of various types of data with the engine unit 40.

Figure 3:
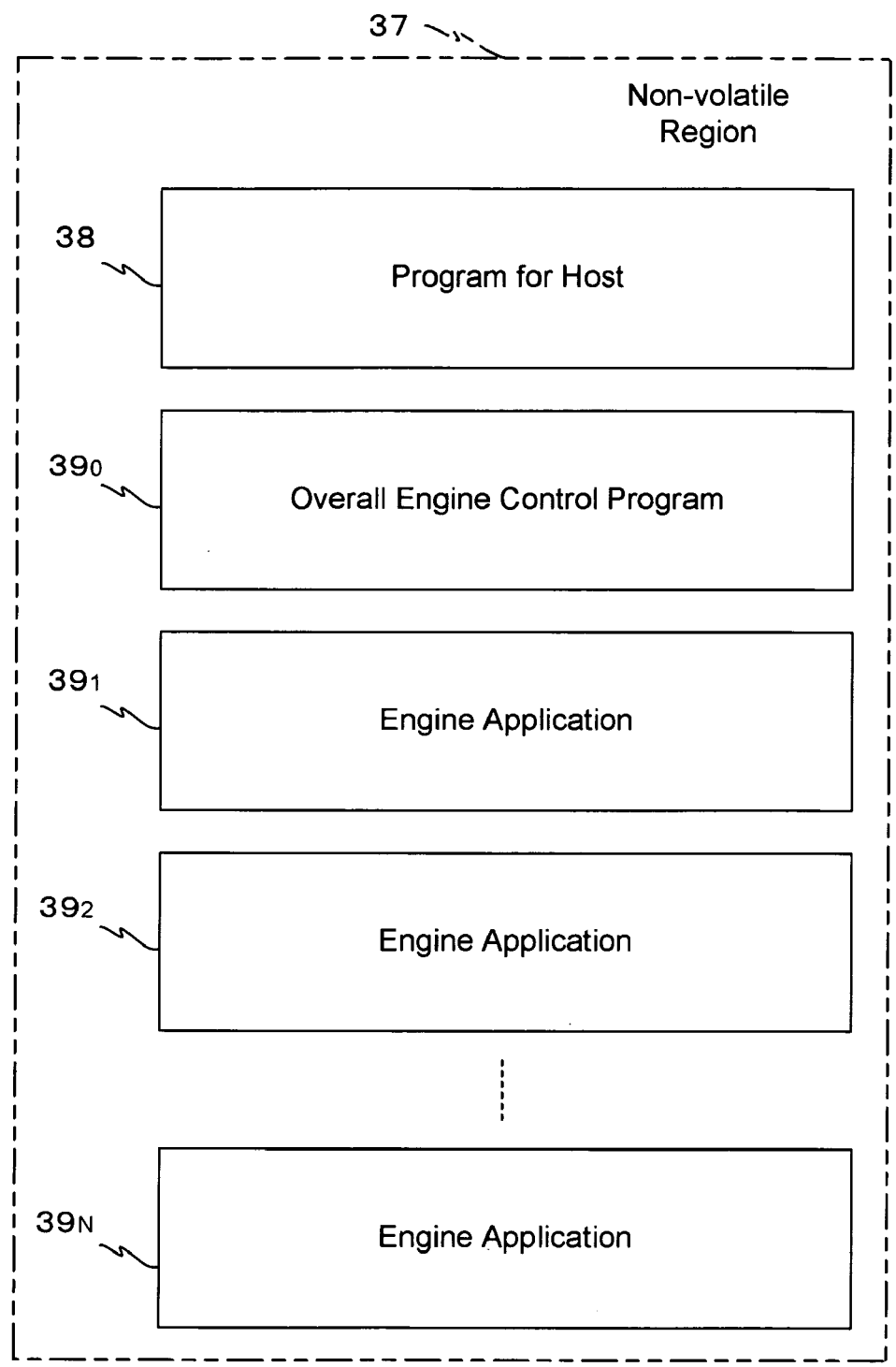
FIG. 3 is a figure for explanation of the contents of a non-volatile region in a storage unit of a host unit of FIG. 2.

The storage unit 35 comprises a volatile region 36 for temporarily storing various types of data, and a non-volatile region 37 for permanently storing programs and the like. The volatile region 36 is built from a volatile storage element whose stored contents are not guaranteed when the supply of operating electrical power ceases. Furthermore, the non-volatile region 37 is built from a non-volatile storage element whose stored contents are guaranteed when the supply of operating electrical power ceases. Here, as shown in FIG. 3, in the non-volatile region 37, in addition to the above described program for host 38, there are also stored an overall engine control program which is executed by the engine unit 40, and engine applications $39_1, 39_2, \ldots, 39_N$.

Returning to FIG. 2, the engine unit 40 comprises an engine processor 41 which performs overall control of the engine unit 40 as a whole, and a storage unit 42 which stores programs executed by the engine processor 41 and data. Here, the storage unit 42 is connected to the engine processor 41. Moreover, the above described main display unit 25M and speaker 26M are connected to the engine processor 41. The details of the engine processor 41 will be described hereinafter.

Figure 4:
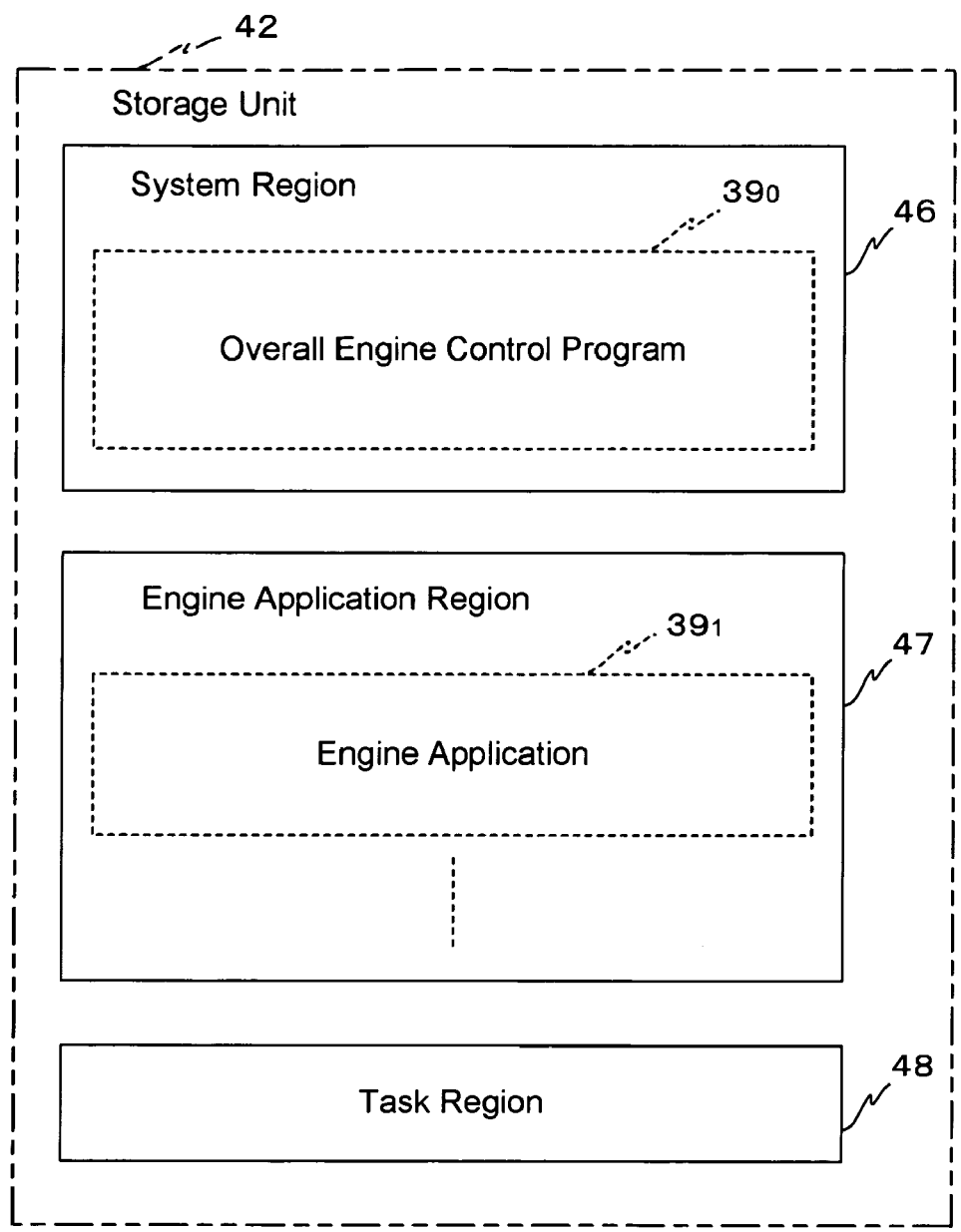
FIG. 4 is a figure for explanation of the structure of a storage unit of an engine unit of FIG. 2.

The storage unit 42 is built from a volatile storage element whose stored contents are not guaranteed when the supply of operating electrical power ceases. Here, as shown in FIG. 4, in the storage unit 42, there are provided a system region 46 in which the above described overall engine control program $39_0$ is stored, an engine application region 47 in which one or more engine application $39_k$ (where k=1, . . . ) are stored, and a task region 48 which is used by the overall engine control program $39_0$ and the engine application which is being executed. It should be understood that, along with the overall engine control program $39_0$ being loaded into the engine unit from the host unit 30 during device initialization, it is also arranged for the engine application $39_k$ to be loaded into the engine unit from the host unit 30 in response to a command from the user.

It should be understood that the host unit 30 and the engine unit 40 are, for example, connected to the host unit 30 by an 8 bit parallel interface data signal IDT and an interface control signal ICT. According to requirements, commands accompanied by appended data and responses are transferred between the host unit 30 and the engine unit 40 by these signals.

Furthermore, a reset command signal RST, a host output control signal HCT, a host display image signal HID, and a host audio signal HAD are supplied from the host unit 30 to the engine unit 40. The operational control of the engine unit 40 by these signals will be described hereinafter.

In the following, a program development support device according to an embodiment of the present invention will be explained with reference to FIGS. 5 through 20. It should be understood that, to elements which are the same or equivalent, the same reference symbols are appended, and duplicated explanation thereof will be omitted.

Structure

Figure 5:
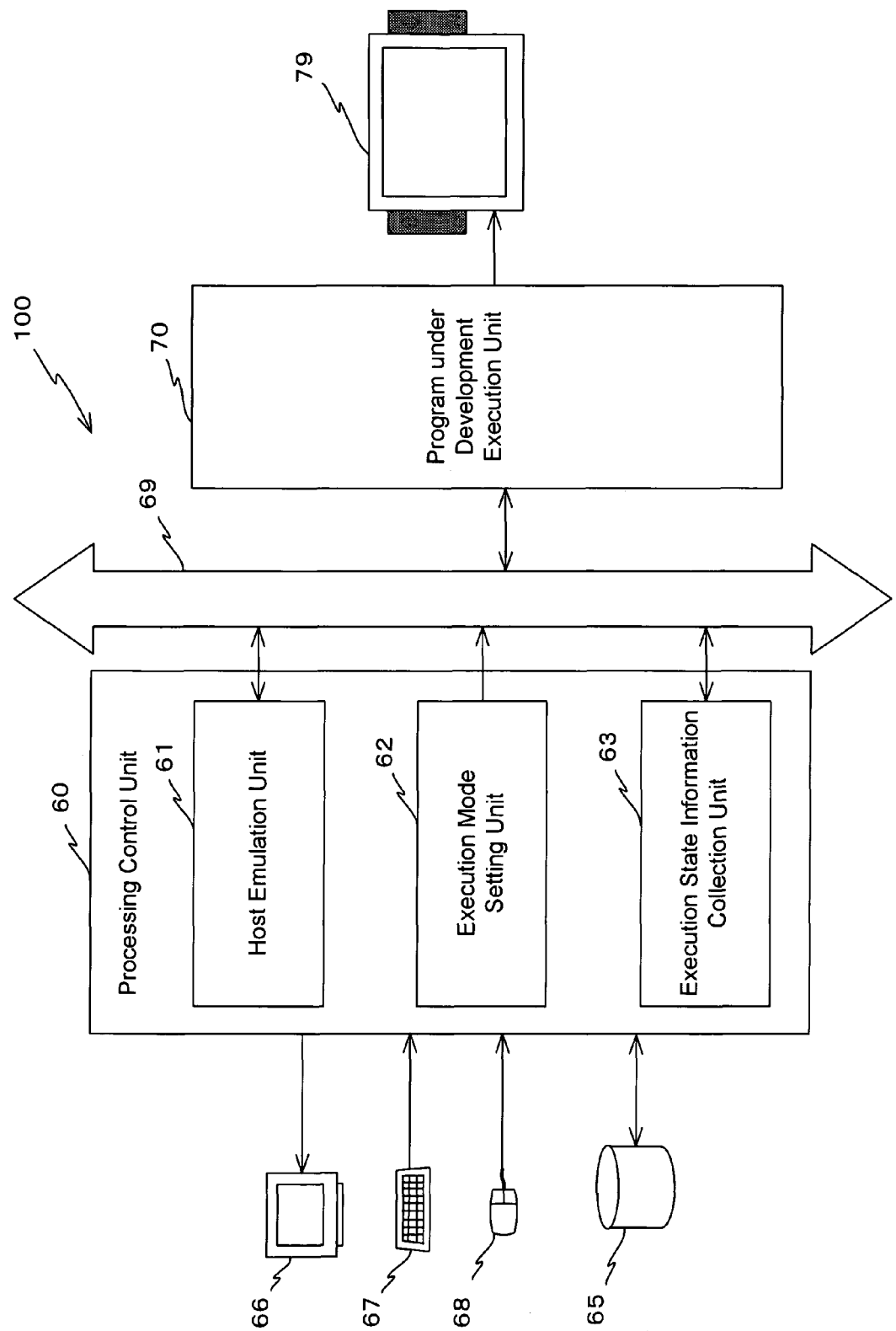
FIG. 5 is a block diagram for explanation of the structure of the program development support device according to an embodiment.

In FIG. 5, the schematic structure of this program development support device 100 according to an embodiment is shown as a block diagram. This program development support device 100 is a device for developing an application program to be executed by the engine unit 40 of the cellular phone 10 described above.

As shown in FIG. 5, the program development support device 100 comprises (a) a processing control unit 60 which performs overall control of the device as a whole; and (b) a program under development execution unit 70 which executes the program under development. This processing control unit 60 and program under development execution unit 70 are connected together via an internal bus 69.

Moreover, the program development support device 100 comprises (c) a display device 66 such as a liquid crystal display device or the like which displays images or characters based upon control by the processing control unit 60, (d) a stroke device 67 such as a keyboard or the like which inputs commands and data to the processing control unit 60, and (e) a pointing device such as a mouse or the like which inputs a position upon the screen of the display device 66 to the processing control unit 60. These devices 65 through 68 are connected to the processing control unit 60.

Furthermore, the program development support device 100 also comprises (f) a NTSC system television receiver 79. This television receiver 79 is connected to the program under development execution unit 70.

It should be understood that, in this embodiment, the program development support device is constituted by a personal computer system. Here, the program development support device 100 is constituted by an I/O module which can be implemented upon said personal computer.

The processing control unit 60 comprises (i) a host emulation unit 61 which performs emulation of the host unit 30 of the above described cellular phone 10, (ii) an execution mode setting unit 62 which sets an execution mode for the program under development by the program under development execution unit 70, and (iii) an execution state information collection unit 63 which collects execution state information for the program under development from the program under development execution unit 70. It should be understood that, in this embodiment, the processing control unit 60 is made up from the central processing unit (CPU) and its peripheral devices such as disks and the like, while it is arranged for the functions of the host emulation unit 61, the execution mode setting unit 62, and the execution state information collection unit 63 described above to be implemented in software.

The host emulation unit 61 issues program execution control commands to the program under development execution unit 70, according to the commands of the developer who is using the stroke device 67 or the pointing device 68. This type of program execution control command for the program under development may be an execution start command, an execution stop command, a pause command, or a resumption command.

Moreover, the host emulation unit 61 includes the above described overall engine control program $39_0$ and the program under development. And, according to the commands of the developer who is using the stroke device 67 or the pointing device 68, the overall engine control program $39_0$ and the program under development come to be loaded into the program under development execution unit 70.

Yet further, the host emulation unit 61 receives responses to the above type of execution control commands from the program under development execution unit 70. Furthermore, upon receipt of a command from the program under development execution unit 70, the host emulation unit 61 displays the details thereof upon the display device 66. And it returns an appropriate response, according to a command from the developer who has referred to the details of that command and has used the stroke device 67 or the pointing device 68.

The execution mode setting unit 62 forwards an execution mode setting to the program under development execution unit 70, according to a command from the developer who has used the stroke device 67 or the pointing device 68. In this type of execution mode information, there are included immediate operation stoppage setting, operation resumption setting, break point setting, single step execution setting and the like related to program execution during the execution of the program under development by an engine processor 41 (refer to FIG. 6) of the engine unit 40 which will be described hereinafter.

When the program execution operation by the engine processor 41 has stopped and a report has arrived from the program under development execution unit 70, the execution state information collection unit 63 receives the contents of an internal register of the engine processor 41 at the time point that program execution operation has stopped, and displays this upon the screen of the display device 66. Moreover, while the operation of the engine processor 41 is stopped, according to a command from the developer who has used the stroke device 67 or the pointing device 68, the execution state information collection unit 63 sends, to the program under development execution unit 70, a request which will be described hereinafter for the command history of the program under development execution unit 70, or a read out request for the contents stored in the storage unit 42. And, as a return response to this read out request which has arrived, the execution state information collection unit 63 displays the command history or the contents stored in the designated region of the storage unit 42 upon the screen of the display device 66.

Figure 6:
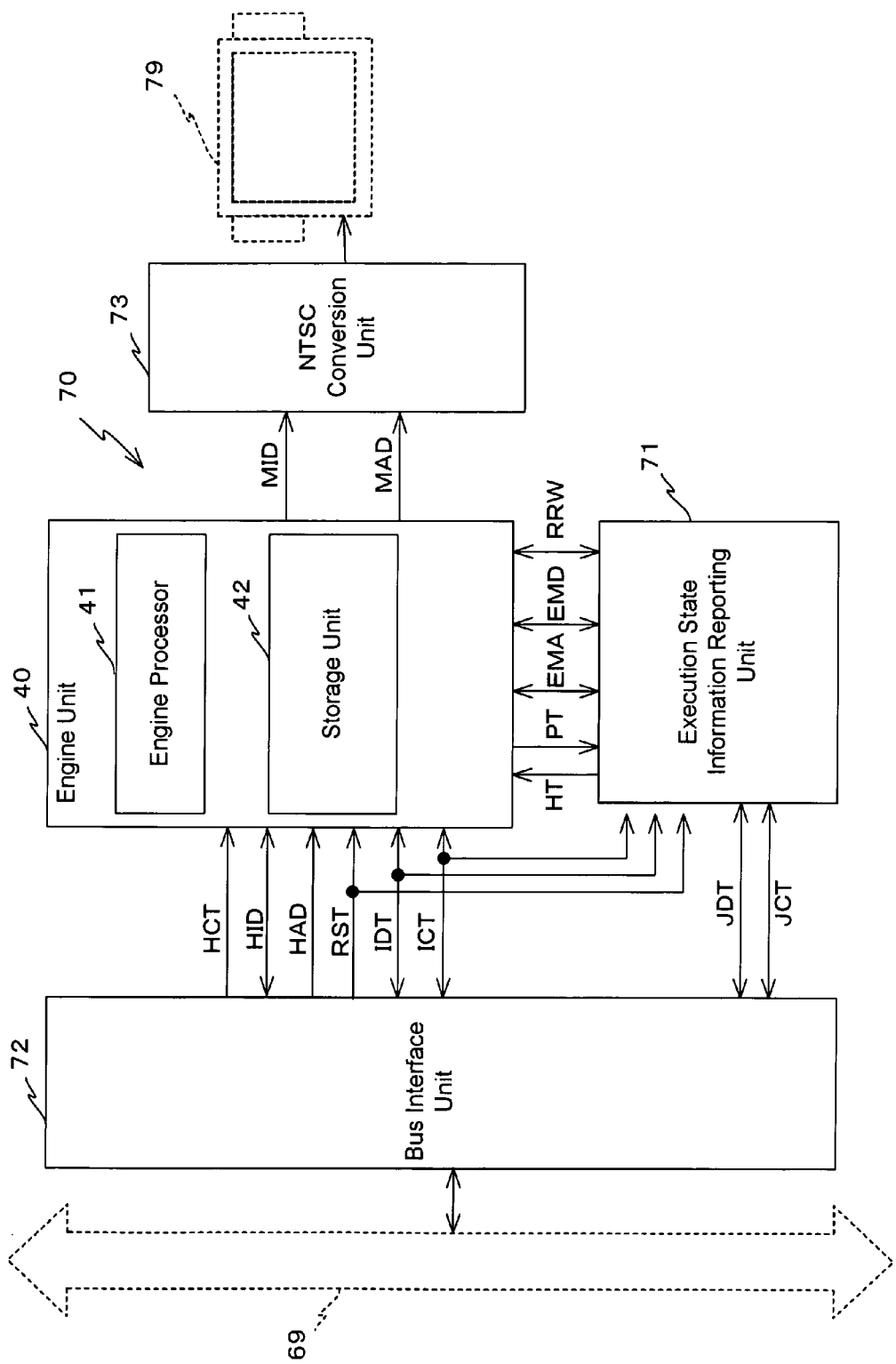
FIG. 6 is a block diagram for explanation of the structure of a program under development execution unit of FIG. 5.

As shown in FIG. 6, the program under development execution unit 70 comprises an engine unit 40, an execution state information reporting unit 70, a bus interface unit 72, and an NTSC conversion unit 73. A display image signal MID and an audio signal MAD which have been outputted from the engine unit 40 are converted into NTSC format by the NTSC conversion unit 73, and are outputted to a television receiver 79.

The engine unit 40 is structured in a similar manner to the case of the cellular phone 10. In other words, the engine unit 40 comprises an engine processor 41 and a storage unit 42. Here, the storage unit 42 is connected to the engine processor 41 (refer to FIG. 7).

Figure 7:
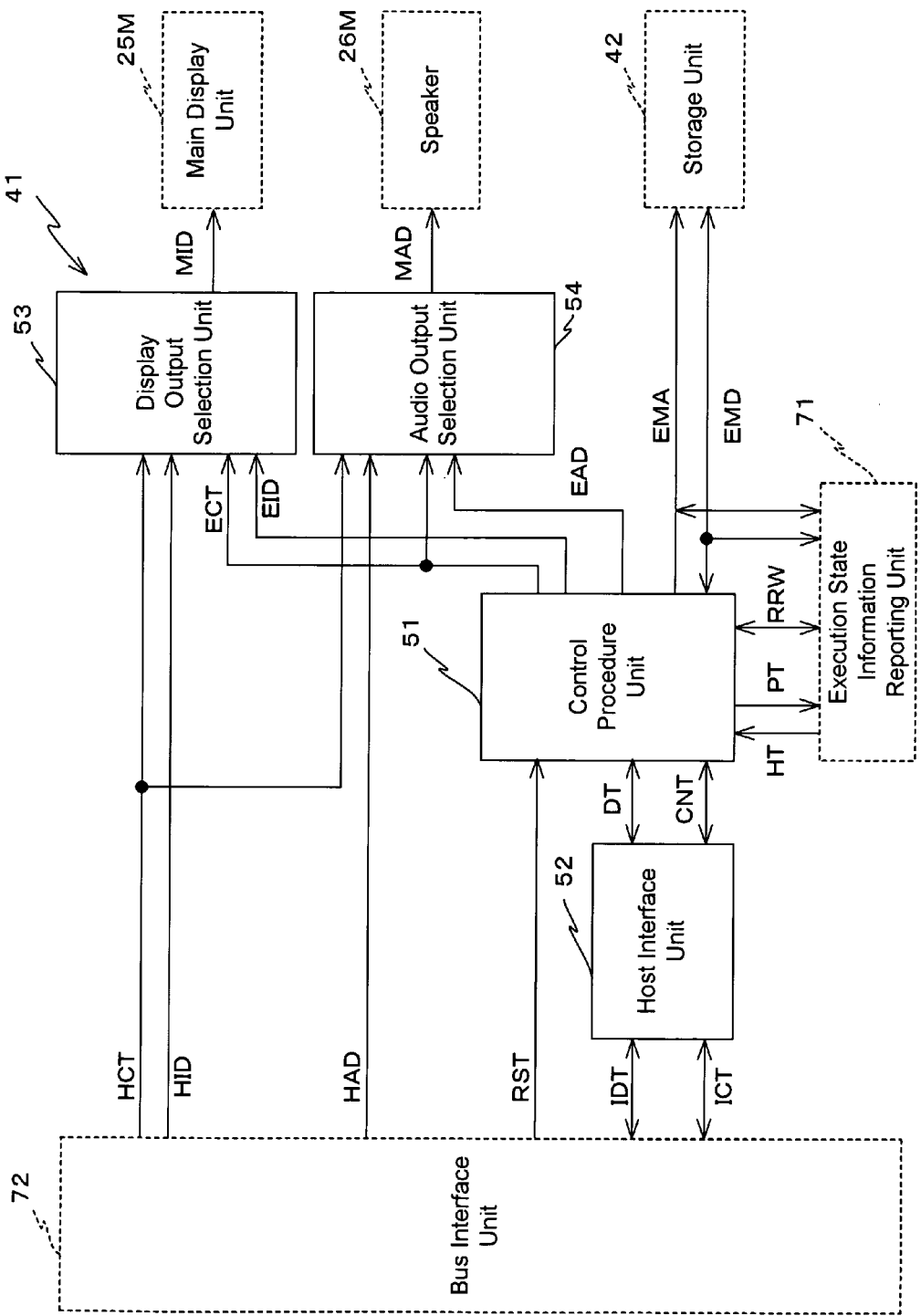
FIG. 7 is a block diagram for explanation of the structure of the engine unit of FIG. 5.

As shown in FIG. 7, the engine processor 41 comprises a control procedure unit 51 and a host interface unit 52. Moreover, the engine processor 41 comprises a display output selection unit 53 for selecting either a host display image signal HID from the host unit 30 or an engine display image signal EID from the control procedure unit 51 as the display image signal MID to be supplied to the main display unit 25M, and for supplying this selected signal to the main display unit 25M. Furthermore, the engine processor 41 comprises an audio output selection unit 54 for selecting either a host audio signal HAD from the host unit 30 or an engine audio signal EAD from the control procedure unit 51 as the audio signal MAD to be supplied to the speaker 26M, and for supplying this selected signal to the speaker 26M.

The control procedure unit 51 performs execution of the overall engine control program $39_0$ which is stored in the storage unit 42, and operation to execute the program under development based upon control by this overall engine control program $39_0$. It should be understood that this control procedure unit 51 is endowed with a three dimensional graphic processing function and a sound generation processing function, and exercises this three dimensional graphic processing function and this sound generation processing function during the execution of any one of the above described engine applications $39_1, 39_2, \ldots$.

Moreover, the control procedure unit 51 stops the operation for executing the program when an operation stoppage request signal HT from the execution state information reporting unit 71 becomes significant. And, when subsequently this operation stoppage request signal HT becomes non-significant, the control procedure unit 51 resumes the execution of the program. It should be understood that, when the operation stoppage request signal HT becomes significant during the execution of a command, it is arranged for the control procedure unit 51 to stop the operation after the execution of this command has ended.

When, during this stoppage of program execution operation, a register read out request by a bidirectional register read out signal RRW arrives from the execution state information reporting unit 71, then the control procedure unit 51 reports the contents of dedicated registers such as a program counter, a status register and the like, and the contents of general purpose registers, to the execution state information reporting unit 71 via a register read out signal.

Furthermore, during this stoppage of program execution operation, the control procedure unit 51 sets the output states of a memory address signal EMA and a memory data signal EMD and the like for accessing the storage unit 42 to the high impedance state. As a result, access to the storage unit 42 by the execution state information reporting unit 71 becomes possible. It should be understood that, when the control procedure unit 51 is performing program execution operation, it is arranged for the output states of the memory address signal EMA and the memory data signal EMD and the like from the execution state information reporting unit 71 to be set to the high impedance state.

Moreover, it is arranged for the control procedure unit 51 to output various operation cycles such as a command fetch cycle, a data read cycle, a data write cycle and so on as a processor state signal PT.

The host interface unit 52 is positioned between the host unit 30 and the control procedure unit 51, and performs buffering of various types of command and various types of data which are transferred between the host unit 30, and mediation of various types of control signal. This host interface unit 52 comprises a two-port RAM (Random Access Memory) element.

In the host interface unit 52, one of the ports of this two-port RAM element is connected to the control procedure unit 51 by an internal data signal DT and an internal control signal CNT. Here, in this internal control signal CNT, there are included an internal read out command signal from the two-port RAM and an internal write command signal to the two-port RAM, issued by the control procedure unit 51 to the host interface unit 52, and the like. Moreover, in this internal control signal CNT, there is included an internal interrupt signal, issued by the host interface unit 52 to the control procedure unit 51, which indicates that data has been send from the host unit 30 to the engine unit 40, and the like.

Moreover, in the host interface unit 52, the other port of the two-port RAM element is connected to the host unit 30 by, for example, the 8-bit parallel interface data signal IDT and the interface control signal ICT. Here, an interface read out command signal from the two-port RAM and an interface write command signal to the two-port RAM, issued by the host unit 30 to the host interface unit 52 and the like are included in this interface control signal ICT. Moreover, in this interface control signal ICT, there is included an interface interrupt signal, issued by the host interface unit 52 to the host unit 30, which indicates that data has been send from the engine unit 40 to the host unit 30, and the like.

By exchanging signals like those described above via the host interface unit 52, it is arranged to perform transfer of commands and responses accompanied by appended data between the host unit 30 and the engine unit 40, according to requirements.

According to designation by the host output control signal HCT from the host unit 30 and by the engine output control signal ECT from the control procedure unit 51, one of the host display image signal HID and engine display image signal EID is selected and outputted by the display output selection unit 53 as the display image signal MID, in the following manner. Here, if priority display of a host screen is designated by the host output control signal HCT, then, irrespective of the designation by the engine output control signal ECT, the display output selection unit 53 selects the host display image signal HID and outputs it as the display image signal MID. On the other hand, if priority display of the host screen is not designated by the host output control signal HCT, then the display output selection unit 53 sets the display image signal MID according to the designation by the engine output control signal ECT, and selects one of the host display image signal HID and the engine display image signal EID.

In other words, if priority display of the host screen is not being designated by the host output control signal HCT, and moreover display of the engine screen is being designated by the engine output control signal ECT, then the engine display image signal EID is selected by the display output selection unit 53, and is outputted as the display image signal MID. Furthermore, by the display output selection unit 53, if priority display of the host screen is not being designated by the host output control signal HCT, and moreover display of the engine screen is not being designated by the engine output control signal ECT, then the display output selection unit 53 selects the host display image signal HID, and outputs it as the display image signal MID.

According to designation by the host output control signal HCT and the engine output control signal ECT, in a similar manner to the action of the display output selection unit 53 described above, one of the host audio signal HAD and the engine audio signal EAD is selected by the audio output selection unit 54 and is outputted as the audio signal MAD. In other words, if priority output of the host audio has been designated by the host output control signal HCT, then, irrespective of the designation by the engine output control signal ECT, the audio output selection unit 54 selects the host audio signal HAD and outputs it as the audio signal MAD. Furthermore, if priority output of the host audio is not being designated by the host output control signal HCT, and moreover engine application audio output is being designated by the engine output control signal ECT, then the audio output selection unit 54 selects the engine audio signal EAD and outputs it as the audio signal MAD. Moreover, if priority output of the host audio is not being designated by the host output control signal HCT, and moreover engine application audio output is not being designated by the engine output control signal ECT, then the audio output selection unit 54 selects the host audio signal HAD and outputs it as the audio signal MAD.

Figure 8:
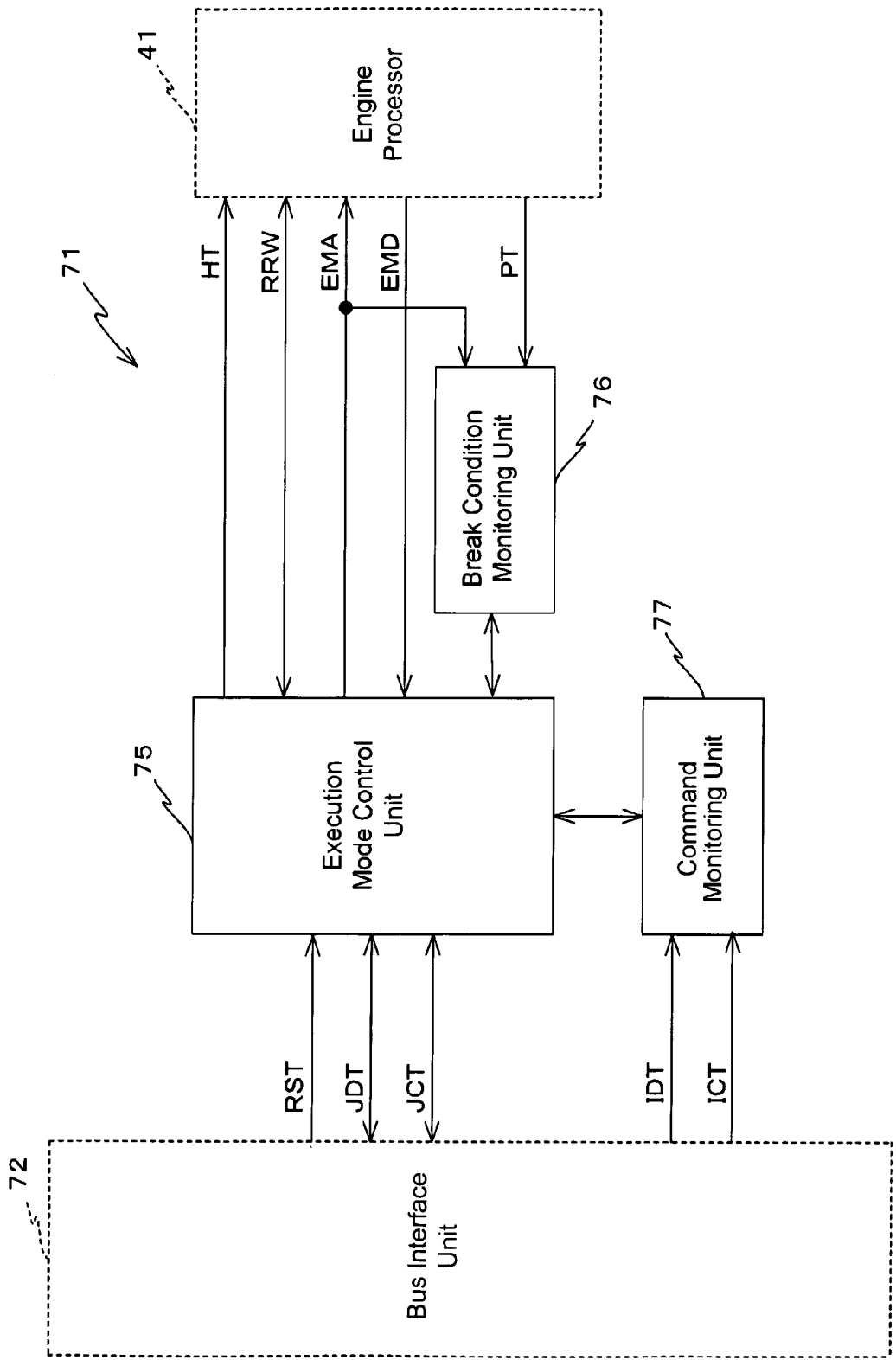
FIG. 8 is a block diagram for explanation of the structure of an execution state information reporting unit of FIG. 6.

As shown in FIG. 8, the execution state information reporting unit 71 comprises an execution mode control unit 75, a break condition monitoring unit 76, and a command monitoring unit 77. It should be understood that it may be arranged for this execution state information reporting unit 71 to perform exchange of various kinds of information with the processing control unit 60 by, for example, an 8-bit parallel interface data signal JDT and the interface control signal ICT, and by the bus interface unit 72 and the interface control signal ICT.

The execution mode control unit 75 controls the overall state of the execution state information reporting unit 71 as a whole. Furthermore, the execution mode control unit 75 performs processing corresponding to execution mode setting which has been received via the internal bus 69 from the execution mode setting unit 62 of the processing control unit 60.

Here, if the execution mode setting is immediate stoppage of operation, then the execution mode control unit 75 sets a direct operation stoppage request signal HT to significant. Furthermore, if the execution mode setting is resumption of operation, then the execution mode control unit 75 sets the direct operation stoppage request signal HT to non-significant.

Moreover, if the execution mode setting is setting of a break point, then the execution mode control unit 75 notifies the break address which has been designated to an execution address monitoring unit as a detection condition. Moreover, if the execution mode setting is single step execution setting, then it notifies the fact that the next command fetch cycle has been entered as being the condition which must be detected.

If a break point address has been notified as a detection condition in this manner, then a break condition monitoring unit 76 reports to the execution mode control unit 75 the fact that an event which satisfies the detection condition has taken place, when a memory address in a memory address signal EMA outputted by the control procedure unit 51 in the command fetch cycle agrees with the break point address which has been notified. Moreover, if the fact that the command fetch cycle has been entered has been notified as the detection condition, then the break condition monitoring unit 76 reports to the execution mode control unit 75 the fact that an event which satisfies the detection condition has taken place, when the control procedure unit 51 enters the next command fetch cycle.

When, in this manner, the fact that an event which satisfies the detection condition has taken place is notified from the break condition monitoring unit 76, then the execution mode control unit 75 sets the operation stoppage request signal HT to significant, and stops the operation of the control procedure unit 51. Subsequently, the execution mode control unit 75 makes a register read out request to the control procedure unit 51, and reads out the contents of various internal registers. And the execution mode control unit 75 reports the results of this reading out to the processing control unit 60 via the bus interface unit 72 and the internal bus. It should be understood that, even if the execution mode control unit 75 has set the operation stoppage request signal HT to significant in response to an execution mode setting for immediate stoppage of operation, and has stopped the operation of the control procedure unit 51, still it reads out the contents of various internal registers in the control procedure unit 51, and reports these contents to the processing control unit 60.

Moreover, in response to an execution information request which it has received from the execution state information collection unit 63 of the processing control unit 60 via the internal bus 63, the execution mode control unit 75 acquires execution information of the engine unit 40 at this time point, and reports this information to the execution state information collection unit 63 via the internal bus 69. Here, in this execution information request, there may be included a request for reporting storage contents in the storage unit 42, or a request for the history of commands and responses and so on recorded in the command monitoring unit 77, such as program execution control commands which have been exchanged between the host emulation unit 61 and the engine unit 40, or the like.

It should be understood that it is arranged for the command monitoring unit 77 to record the commands and responses which have been exchanged between the host emulation unit 61 and the engine unit 40 in time sequence. The storage region within the command monitoring unit 77 which is used for storing such commands and responses is made as a so called ring buffer, and is of the so called FIFO (First-In First-Out) type.

Furthermore, upon receipt of a buffer reset command from the execution mode control unit 75, it is arranged for the pointer information which is used for storing commands and responses by the command monitoring unit 77 to be reset.

Operation

Next, the operation for program support of the program development support device 100 which has the structure described above will be explained.

Initialization of the Program Under Development Execution Unit

The program under development execution unit 70 is reset by a reset command issued by the host emulation unit 61 of the processing control unit 60. This reset command is issued when the program development support device 100 is initialized, or according to a reset request for the program under development execution unit 70 from the developer by actuation of the stroke device 67 or the pointing device 68.

Upon the reset command described above, the host emulation unit 61 sends a reset command to the program under development execution unit 70 via the internal bus 69. And, in the program under development execution unit 70, the bus interface unit 72 receives this reset command. And, upon receipt of the reset command, the bus interface unit 72 sets a reset command signal RST to a significant level for a predetermined period, and thus notifies the reset command to the engine unit 40 and the execution state information reporting unit 71.

Upon receipt of the reset command, the engine unit 40 goes into an idle state. In this idle state, the above described basic interface program 59 is executed by the control procedure unit 51.

It should be understood that, when the reset command is issued, the host emulation unit 61 sends a host output priority command related to the main display unit 25M and the speaker 26M to the program under development execution unit 70 via the internal bus 69. And, in the program under development execution unit 70, the bus interface unit 72 receives this host output priority command. And, upon receipt of this host output priority command, the bus interface unit 72 notifies the engine unit 40 that, along with priority display of the host screen being designated by the host output control signal HCT, also priority output of the host audio is being designated.

As a result the host image, which has been sent as the host display image signal HID from the host emulation unit 61 via the internal bus 69 and the bus interface unit 72 to the engine unit 40, is displayed upon the main display unit 25M. Moreover the host audio, which has been sent as the host audio signal HAD from the host emulation unit 61 via the internal bus 69 and the bus interface unit 72 to the engine unit 40, is outputted from the speaker 26M. In other words, the main display unit 25M and the speaker 26M come to experience control by the host emulation unit 61.

Moreover, when the engine unit 40 is initialized, designation of engine output with the engine output control signal ECT is cancelled by the engine unit 40. As a result, irrespective of the signal level of the host output control signal HCT, the main display unit 25M and the speaker 26M come to experience control by the host emulation unit 61.

Figure 9:
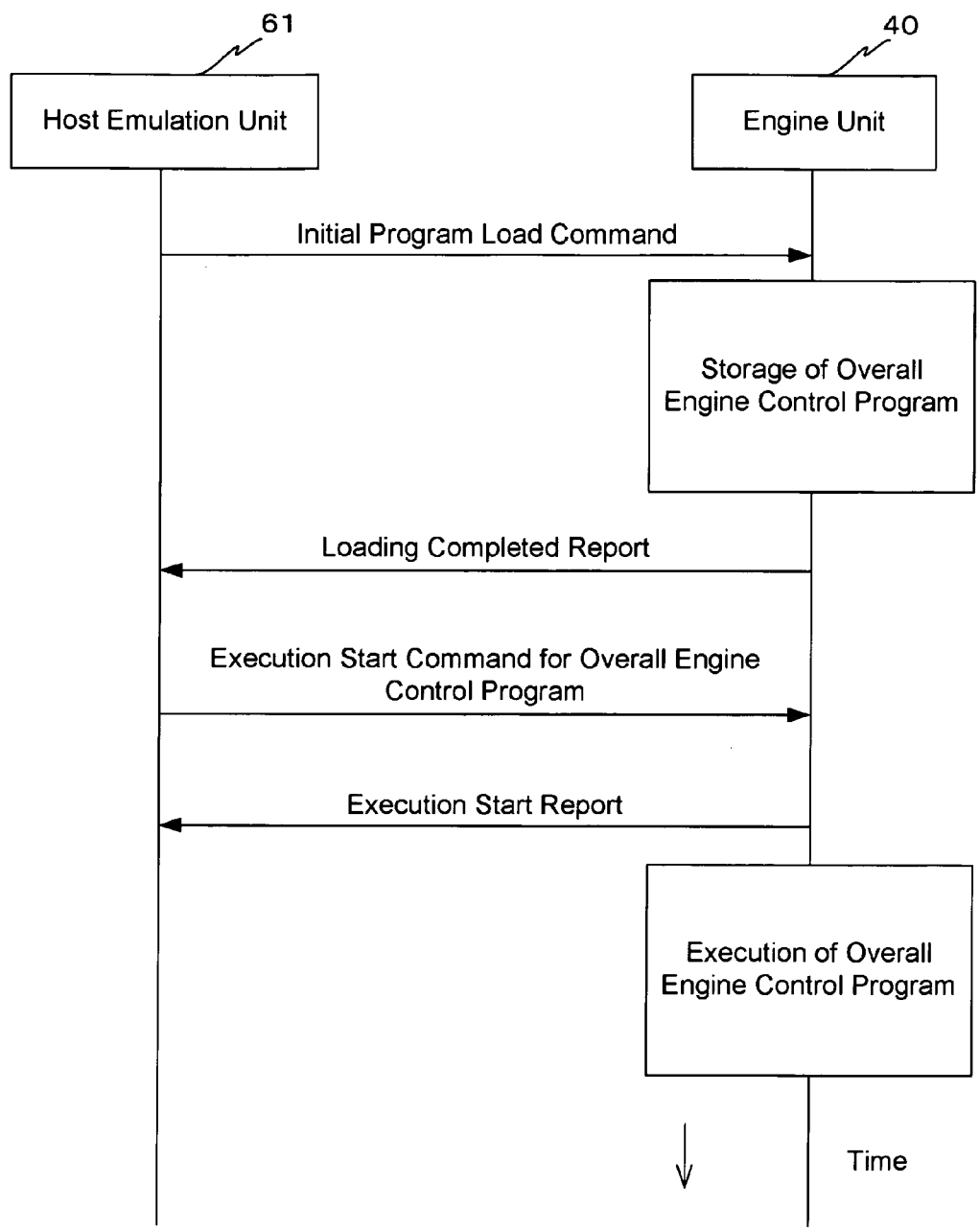
FIG. 9 is a sequence diagram for explanation of processing for initial loading to the engine unit.

When, in this manner, the processing related to the reset command which has been issued from the host emulation unit 61 ends, initial loading processing is performed, from loading of the overall engine control program $39_0$ from the host emulation unit 61 to the engine unit 40, until the start of execution. In this initial loading processing, as shown in FIG. 9, first, the host emulation unit 61 forwards to the engine unit 40, via the internal bus 69 and the bus interface unit 72, an initial program loading command, with the overall engine control program $39_0$ as appended data.

The overall engine control program $39_0$, which has thus been sent from the host emulation unit 61 as data appended to the initial program load command, is stored by the engine unit 40 in the system region 46 of the storage unit 42. When the storage of the overall engine control program $39_0$ in the storage unit 42 in this manner ends, the basic interface program 49 sends a loading completed report for the overall engine control program $39_0$ to the host emulation unit 61, via the bus interface unit 72 and the internal bus 69.

When this loading completed report for the overall engine control program $39_0$ is received by the host emulation unit 61, it forwards to the engine unit 40, via the internal bus 69 and the bus interface unit 72, an execution start command for the overall engine control program $39_0$, with no appended data.

When this execution start command for the overall engine control program $39_0$ is received by the engine unit 40, the control procedure unit 51, along with starting the execution of the overall engine control program $39_0$, also sends an execution start report for the overall engine control program $39_0$ to the host emulation unit 61 via the bus interface unit 72 and the internal bus 69.

The initial loading processing terminates in this manner. When, due to this initial loading processing, the execution of the overall engine control program $39_0$ by the engine unit 40 starts, the state of the engine unit 40 transits from the idle state to the ready state. In this ready state, control and processing are performed by execution of the overall engine control program $39_0$.

It should be understood that, when this initial loading processing is completed, the host emulation unit 61 cancels the priority output designation of the host image and the host audio by the signal level of the host output control signal HCT. On the other hand, the state in which designation of output of the engine image and the engine sound by the engine output control signal ECT is not performed by the engine unit 40 is maintained. As a result, when the engine unit 40 is in the ready state as well, the main display unit 25M and the speaker 26M come to experience control by the host emulation unit 61, in a similar manner to when the engine unit 40 is in the idle state.

Loading and Unloading of the Program Under Development (1) Processing for Loading the Program Under Development After the initial loading processing described above has ended normally, when a load command for the program under development is issued by the developer actuating the stroke device 67 or the pointing device 68, the program under development is loaded into the engine unit 40 from the host emulation unit 61 via the internal bus 69 and the bus interface unit 72.

Figure 10:
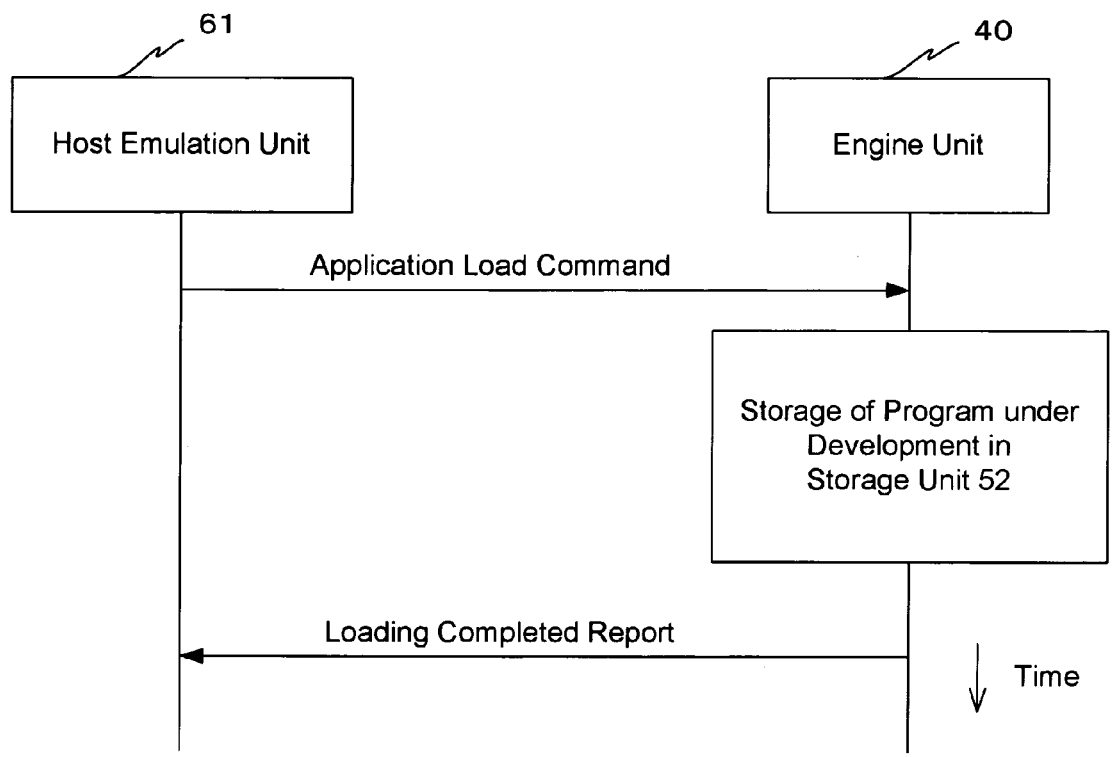
FIG. 10 is a sequence diagram for explanation of processing for loading of the program under development to the engine unit.

This loading processing for the program under development is performed in a similar manner to the initial program loading described above, except for the fact that the program under development is stored in the application region 47 of the storage unit 42. In other words, as shown in FIG. 10, an application load command, with the program under development set as appended data, is forwarded from the host emulation unit 61 to the engine unit 40 via the internal bus 69 and the bus interface unit 72. Upon receipt of the application load command by the engine unit 40, it stores the program under development, which is data appended thereto, in the application region 47 of the storage unit 42. And, when this storage of the program under development in the storage unit 42 is completed, the engine unit 40 sends a loading completed report to the host unit 30 via the bus interface unit 72 and the internal bus 69.

When the above described loading processing of the program under development terminates, the state of the engine unit 40 transits from the ready state to the application loading completed state. In this application loading completed state, the signal level of the engine output control signal ECT is set to a non-significant level by the engine unit 40. As a result the main display unit 25M and the speaker 26M come to experience control by the host emulation unit 61, in a similar manner to when the engine unit 40 is in the above described idle state and ready state.

(2) Processing for Unloading the Program Under Development

Figure 11:
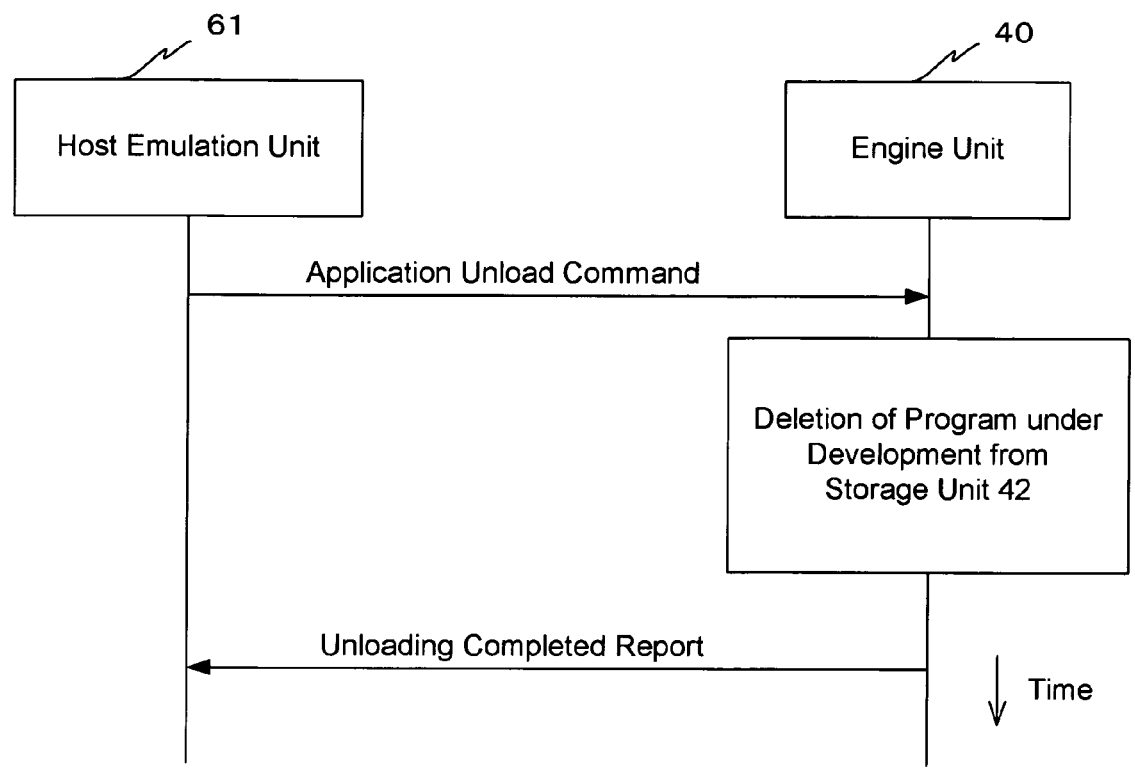
FIG. 11 is a sequence diagram for explanation of processing for unloading of the program under development from the engine unit.

The program under development which has been loaded into the engine unit 40 in this manner can be unloaded by the procedure shown in FIG. 11.

The unloading processing for the program under development is performed in response to an unload command for the program under development due to actuation by the developer of the stroke device 67 or the pointing device 68.

In this unloading processing for the program under development, first, the host emulation unit 61 forwards a program under development unload command to the engine unit 40, in a similar manner to the above described case of an application load command. And, upon receipt of this program under development unload command, the program under development is deleted by the engine unit 40 from the application region 47 of the storage unit 42. And, when this deletion of the program under development from the storage unit 42 is completed, the engine unit 40 notifies an unloading completed report for the program under development to the host emulation unit 61, via the bus interface unit 72 and the internal bus 69.

When the above described unloading processing for the program under development is performed, the state comes to hold in which not even one program is stored in the application region 47 of the storage unit 42, and the state of the engine unit 40 transits from the application program loading completed state to the ready state.

Figure 12:
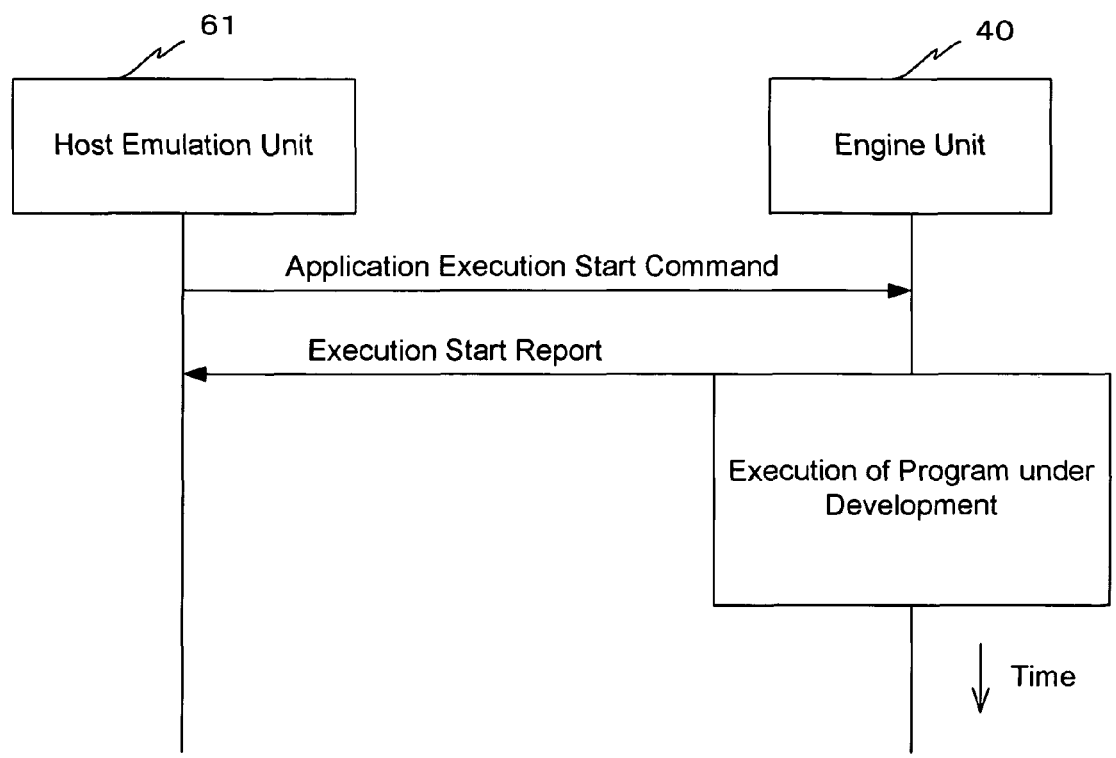
FIG. 12 is a sequence diagram for explanation of processing for starting the execution of the program under development.

Execution Control of the Program Under Development (1) Processing for Starting Execution of the Program Under Development The start of execution of the program under development described above by the engine unit 40 is performed according to the procedure shown in FIG. 12. It should be understood that this processing for starting execution of the program under development is performed in response to an execution start command for the program under development due to actuation by the developer of the stroke device 67 or the pointing device 86.

In this processing for starting execution of the program under development, first, the host emulation unit 61 forwards a program under development execution start command to the engine unit 40, in a similar manner to the case of the program under development unload command described above. Upon receipt of this program under development execution start command, the engine unit 40, along with starting the execution of the program under development, also returns an execution start report for the program under development to the host emulation unit 61.

When the above described execution start processing for the program under development is performed and the execution of the program under development is started, the state of the engine unit 40 transits from the application loading completed state to the application operating state. In this application operating state, output designation of the engine image and the engine audio by the engine output control signal ECT is performed by the engine unit 40. As a result, in this application operating state, the host emulation unit 61 does not control the main display unit 25M and the speaker 26M in the host mode as described above, but rather the system goes into the engine mode in which the engine unit 40 controls the main display unit 25M and the speaker 26M.

Figure 13:
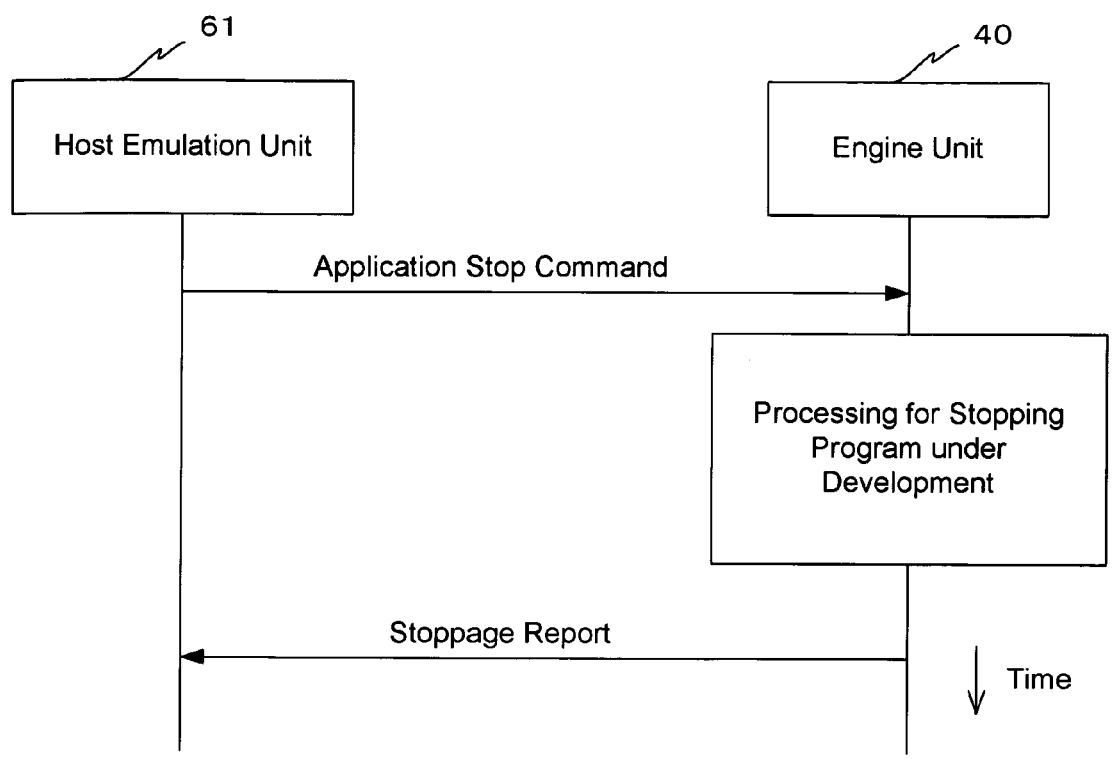
FIG. 13 is a sequence diagram for explanation of processing for stopping the program under development.

(2) Processing for Stopping Execution of the Program Under Development, According to a Command from the Developer During execution, or during pausing by a program under development pause command which will be described hereinafter, the program under development is stopped by the procedure shown in FIG. 13, in response to a stop command for the program under development issued by actuation of the stroke device 67 or the pointing device 68 by the developer.

In this processing for stopping the program under development, first, the host unit 30 forwards to the engine unit 40 an application stop command, in a similar manner to the case of the execution start command for the overall engine control program described above. Upon receipt of this application stop command, the engine unit 40, along with stopping the execution of the program under development, also returns a program under development stoppage report to the host unit 30.

When the execution stops of the program under development which is being executed, so that the application program which is being executed by the engine unit 40 ceases to exist, and when moreover no application which is being paused exists, then the state of the engine unit 40 transits from the application operating state to the application loading completed state. As a result, the system changes over from the engine mode to the host mode.

(3) Processing for Pausing the Program Under Development

Figure 14:
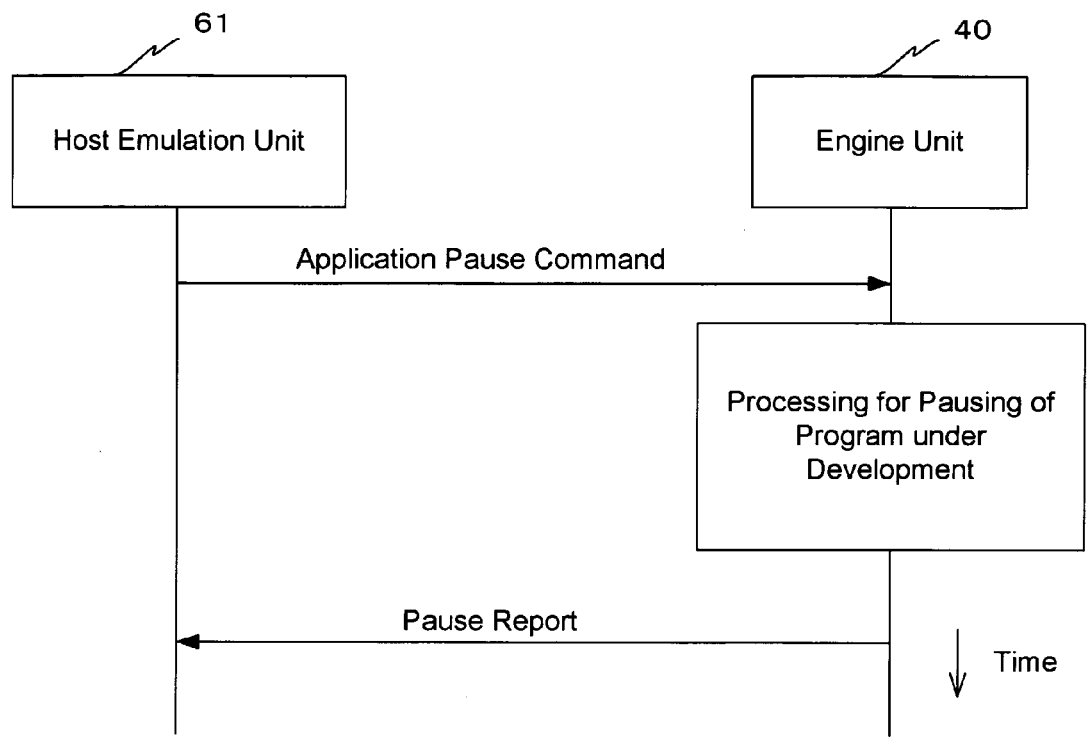
FIG. 14 is a sequence diagram for explanation of processing for pausing the program under development.

In the application operating state, the program under development which is being executed is paused by the procedure shown in FIG. 14. It should be understood that this procedure for pausing the program under development is performed in response to a pause command for the program under development, issued upon actuation by the developer of the stroke device 67 or the pointing device 68.

In this processing for pausing the application, first, the host emulation unit 61 forwards an application pause command to the engine unit 40, in a similar manner to the case of the application stop command described above. And, upon receipt of this application pause command, the engine unit 40, along with pausing the execution of the program under development, also returns a pause report to the program under development.

When the execution of the program under development is paused by the above described processing for pausing the program under development, and the application program which is operating ceases to exist, then the state of the engine unit 40 transits from the application operating state to the application paused state. As a result, the system changes over from the engine mode to the host mode.

(4) Processing for Resumption of the Program Under Development

Figure 15:
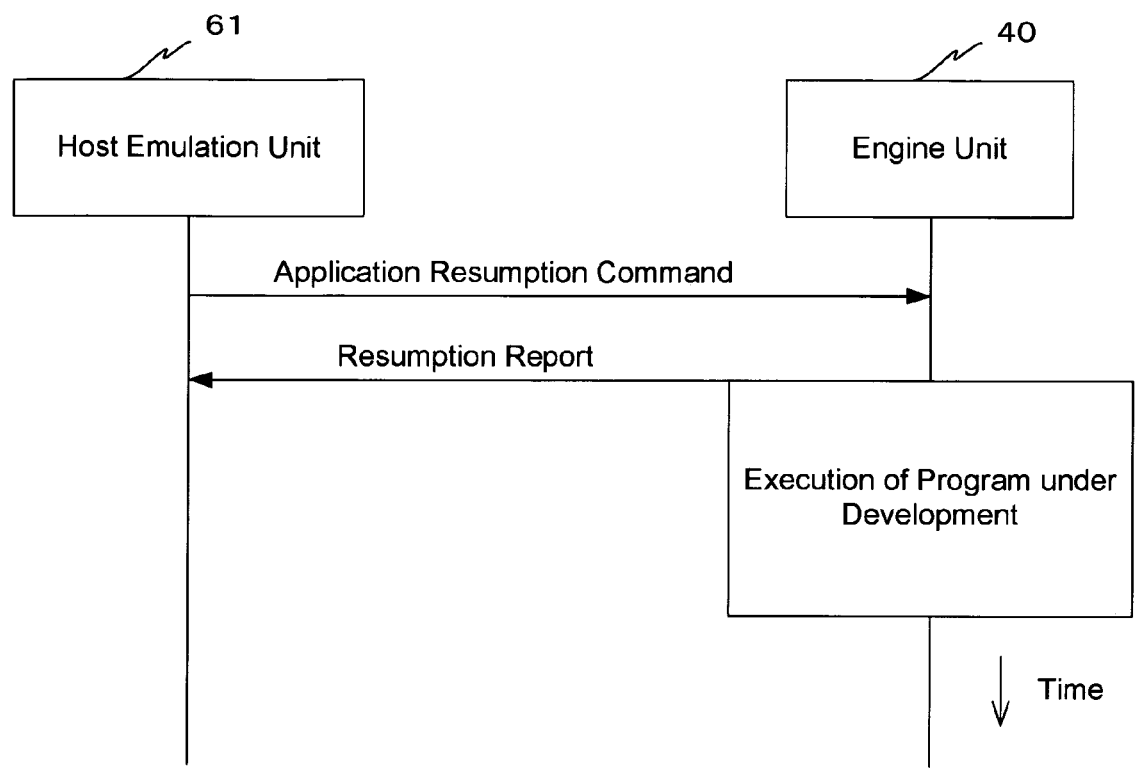
FIG. 15 is a sequence diagram for explanation of processing for resuming the program under development.

The program under development which has been paused as described above can be resumed by the procedure shown in FIG. 15, in response to a pause command for the program under development issued by actuation by the developer of the stroke device 67 or the pointing device 68.

In this program under development resumption processing, first, the host emulation unit 61 forwards an application resumption command to the engine unit 40, in a similar manner to the case of the application pause command described above. And, upon receipt of this application resumption command, the engine unit 40, along with resuming the execution of the program under development, also returns a resumption report for the program under development to the host emulation unit 61.

When in the application paused state the execution of the program under development is resumed by the above described resumption processing of the application under development, the state of the engine unit 40 transits from the application paused state to the application operating state. As a result, the system changes over from the host mode to the engine mode.

As described above, the operational state of the engine unit 40 is controlled by various types of command from the host emulation unit 61.

It should be understood that the contents of the commands which are issued from the host emulation unit 61 as described above, and also the contents of the responses which are issued from the engine unit 40, are collected by the command monitoring unit 77.

Figure 16:
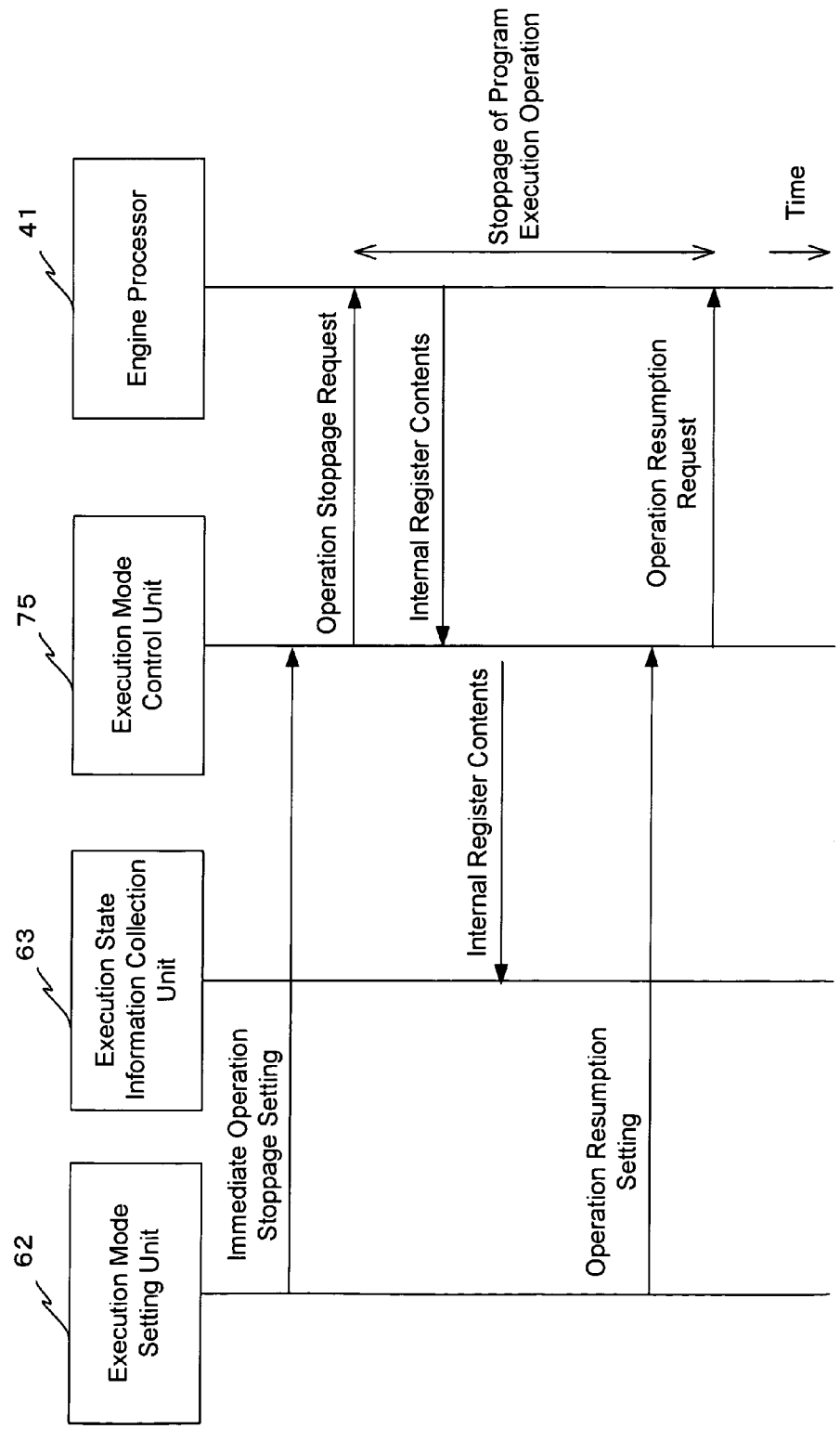
FIG. 16 is a sequence diagram for explanation of processing for immediately stopping, and for resuming, program execution operation.

Control of the Operational Mode of the Engine Processor, and Collection of Execution State Information (1) Immediate Stoppage of Program Execution Operation by the Engine Processor By the developer performing actuation of the stroke device 67 or the pointing device 68 when desired, and issuing an immediate stop command for the engine processor 41, the program execution operation of the engine processor 41 is immediately stopped by the procedure shown in FIG. 16. It should be understood that the program which is being executed by the engine processor 41 is immediately stopped by the procedure shown in FIG. 16, whether it is the overall engine control program $39_0$, or is a program under development.

In this processing for immediately stopping the engine processor, upon receipt of an immediate operation stop command for the engine processor 41 by the developer, the execution mode setting unit 62 sends an immediate operation stoppage setting to the execution mode control unit 75 via the internal bus 69 and the bus interface unit 72. And, upon receipt of this immediate operation stoppage setting, the execution mode control unit 75 immediately sets the operation stoppage request signal HT to significant, and issues an operation stoppage request to the engine processor 41. Upon receipt of this operation stoppage request by the engine processor 41, the control procedure unit 51 stops program execution operation after the end of execution of the command which is being executed at this time.

It should be understood that, even though the program execution operation is stopped, still the control procedure unit 51 maintains the output contents directly before program execution operation stoppage for the engine output control signal ECT and the engine display image signal EID. Due to this, during the stoppage of program execution operation, the image which was being displayed directly before stoppage of program execution operation is displayed upon the main display unit 25M.

In this manner, after the execution operation of the program has been stopped, the execution mode control unit 75 performs read out requests for the contents of various types of internal register within the control procedure unit 51 of the engine processor 41 using the register read out signal RRW, and reads out the contents of various types of internal registers such as the program counter and the like. And the execution mode control unit 75 reports the results of this reading out to the execution state information collection unit 63 of the processing control unit 60, via the bus interface unit 72 and the internal bus 69.

Upon receipt of this report, the execution state information collection unit 63 displays upon the display device 66 the contents which have been reported, thus supplying them to the developer. As a result, the developer is able to know the execution state information of the engine processor at the time point that the immediate stop command was issued.

It should be understood that, if the immediate operation stoppage setting has been received while program execution operation is being stopped by the control procedure unit 51 of the engine processor 41, then it is arranged for the execution mode control unit 75 only to make a report to the execution state information collection unit 63 that the program execution operation is being stopped.

(2) Resumption from Stoppage of Program Execution Operation by the Engine Processor According to the procedure shown in FIG. 16, the engine processor 41, which has stopped the program execution operation according to the program execution operation stop command described above, resumes the execution operation of the program upon the developer issuing a resumption from stoppage command for the engine processor 41 by performing actuation of the stroke device 67 or the pointing device 68 when desired.

In this program execution operation resumption processing, upon receipt of an operation resumption command for the engine processor 41 from the developer, the execution mode setting unit 62 sends an operation resumption setting to the execution mode control unit 75 via the internal bus 69 and the bus interface unit 72. Upon receipt of this operation resumption setting, the execution mode control unit 75 immediately sets the operation stoppage request signal HT to non-significant, and issues an operation resumption request to the engine processor 41. And, upon receipt of this operation resumption request, in the engine processor 41, the control procedure unit 51 resumes the execution operation of the program from its state directly before operation stoppage.

It should be understood that, upon receipt by the control procedure unit 51 of the engine processor 41 of an operation resumption setting during execution operation of the program, it may be arranged for the execution mode control unit 75 only to make a report to the execution state information collection unit 63 to the effect that program execution operation is being performed.

(3) Break Point Setting

Figure 17:
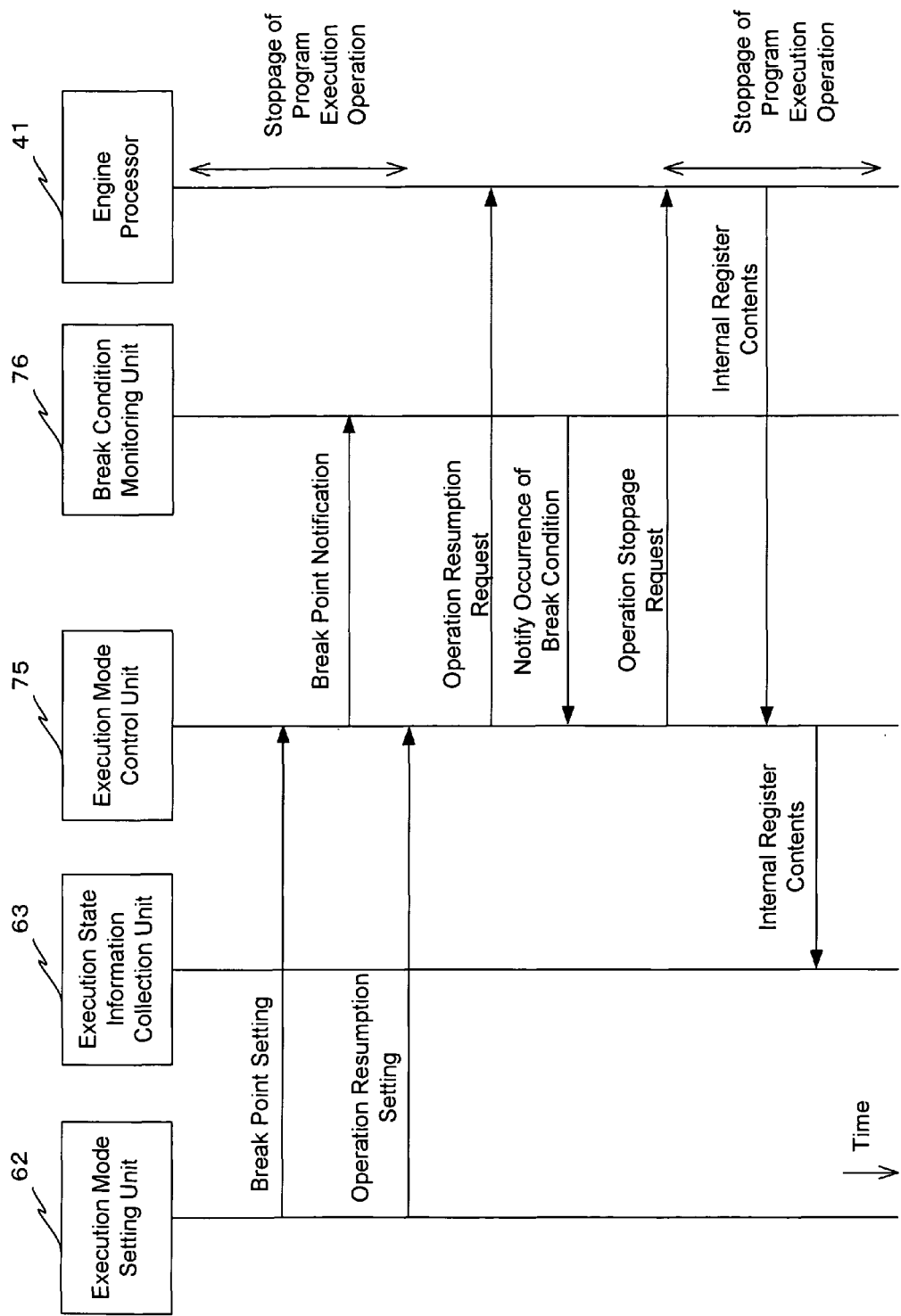
FIG. 17 is a sequence diagram for explanation of break point setting processing.

By actuating the stroke device 67 or the pointing device 68, the developer is able to issue a break point setting command in order to set a break point according to the procedure shown in FIG. 17. Here "break point" is referred to as a program address at which, after execution by the control procedure unit 51 of the engine processor 41, the operation of the engine processor 41 must stop. In this embodiment, it is arranged for this setting of a break point to be performed only when the program execution processing by the engine processor 41 program is stopped.

In this break point setting processing the execution mode setting unit 62, which has received a setting command in which the address of the break point has been set by the developer, sends this break point setting to the execution mode control unit 75 via the internal bus 69 and the bus interface unit 72. Upon receipt of this break point setting, the execution mode control unit 75 notifies the break condition monitoring unit 76 of the break point address value and of the fact that command execution at that break point address is the break condition.

After this break point setting has been completed, by the developer performing actuation of the stroke device 67 or the pointing device 68 to issue a resumption from stoppage command for the engine processor 41, the execution operation of the program is resumed by the engine processor 41, as described above. And, when the engine processor 41 starts execution of the command at this break point address which has been set, the break condition monitoring unit 76 detects the occurrence of this break condition, and notifies this fact to the execution mode control unit 75.

Upon receipt of this break condition occurrence notification, the execution mode control unit 75 immediately sets the operation stoppage request signal HT to significant, and issues an operation stoppage request to the engine processor 41. And, upon receipt of this operation stoppage request by the engine processor 41, the control procedure unit 51 stops program execution, after the end of the execution of the command which was being executed at this time, in other words of the command at the break point address.

When the program execution operation by the engine processor 41 stops in this manner, in a similar manner to the case of the immediate processing for stoppage described above, the execution mode control unit 75 issues a read out request for the contents of various types of internal register within the control procedure unit 51 of the engine processor 41 by using the register read out signal RRW, and reads out the contents of various types of internal register such as the program counter and so on. And the execution mode control unit 75 reports the results of this reading out to the execution state information collection unit 63 of the processing control unit 60 via the bus interface unit 72 and the internal bus 69.

Upon receipt of this report, the execution state information collection unit 63 displays the contents which have been reported upon the display device 66, and thus supplies them to the developer. As a result, the developer is able to know the execution state information of the engine processor 41 at the time point directly after execution of the command at the break point address.

It should be understood that, if the break point setting has been received during execution operation of the program by the control procedure unit 51 of the engine processor 41, then it is arranged for the execution mode control unit 75 only to make a report to the execution state information collection unit 63 to the effect that execution operation of the program is under way.

(4) Single Step Execution Setting

Figure 18:
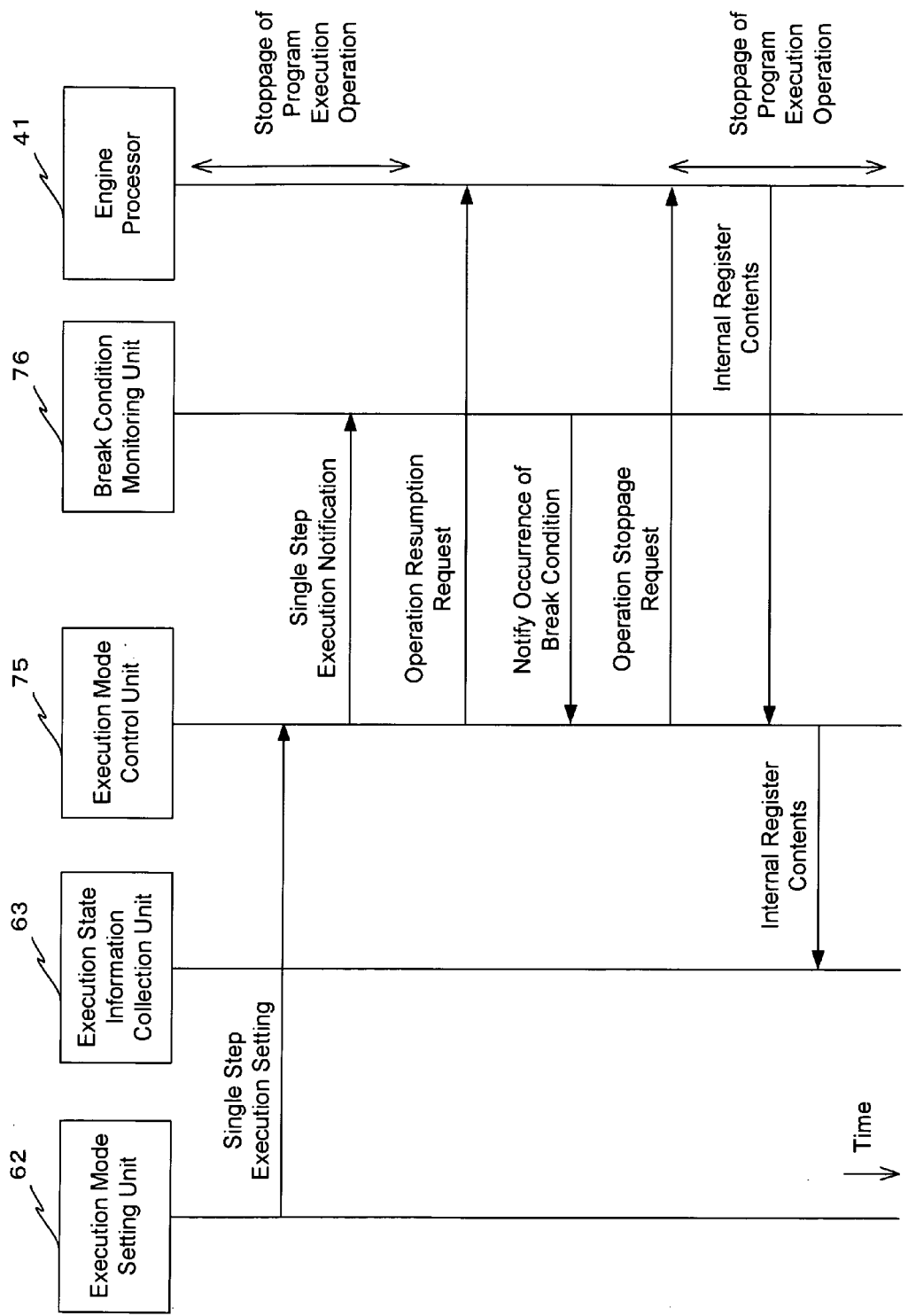
FIG. 18 is a sequence diagram for explanation of step execution processing.

By performing actuation of the stroke device 67 or of the pointing device 68 and issuing a setting command for single step execution, the developer is able to make a setting for single step execution according to the procedure shown in FIG. 18. In this embodiment, it is arranged for this type of setting for single step execution to be made only when the program execution processing by the engine processor 41 is stopped.

In this single step execution setting processing, upon receipt of the single step execution setting command from the developer, the execution mode-setting unit 62 sends a single step execution setting to the execution mode control unit 75 via the internal bus 69 and the bus interface unit 72. And, upon receipt of this single step execution setting, first, the execution mode control unit 75 notifies the break condition monitoring unit 76 of the fact that single step execution is the break condition.

Next, the execution mode control unit 75 issues an operation resumption request to the engine processor 41 by setting the operation stoppage request signal HT to non-significant. As a result, the control procedure unit 51 starts the execution of the next command by the engine processor 41. This start of execution of the next command is detected by the break condition monitoring unit 76 as occurrence of the break condition, and it notifies this fact to the execution mode control unit 75.

Upon receipt of this break condition occurrence notification, the execution mode control unit 75 issues an operation stoppage request to the engine processor 41 by immediately setting the operation stoppage request signal HT to significant. And, upon receipt of this operation stoppage request by the engine processor 41, the control procedure unit 51 stops the program execution operation after the end of the execution of the command which is being executed at this time, in other words of the next command.

When the program execution operation by the engine processor 41 is stopped in this manner, in a similar manner to the case of the above described immediate processing for stoppage and break point processing, the execution mode control unit 75 issues a read out request for the contents of various types of internal register within the control procedure unit 51 of the engine processor 41, and reads out the contents of various types of internal register such as the program counter and so on. And the execution mode control unit 75 reports the results of this reading out to the execution state information collection unit 63 of the processing control unit 60 via the bus interface unit 72 and the internal bus.

Upon receipt of this report, the execution state information collection unit 63 displays the contents which have been reported upon the display device 66, thus supplying them to the developer. And, as a result, the developer is able to know the execution state information of the engine processor at the time point directly after single step execution.

It should be understood that, if the setting for single step execution has been received during execution operation of the program by the control procedure unit 51 of the engine processor 41, then it is arranged for the execution mode control unit 75 to make a report to the execution state information collection unit 63 only to the effect that program execution operation is taking place.

(5) Reading Out of the Command History

Figure 19:
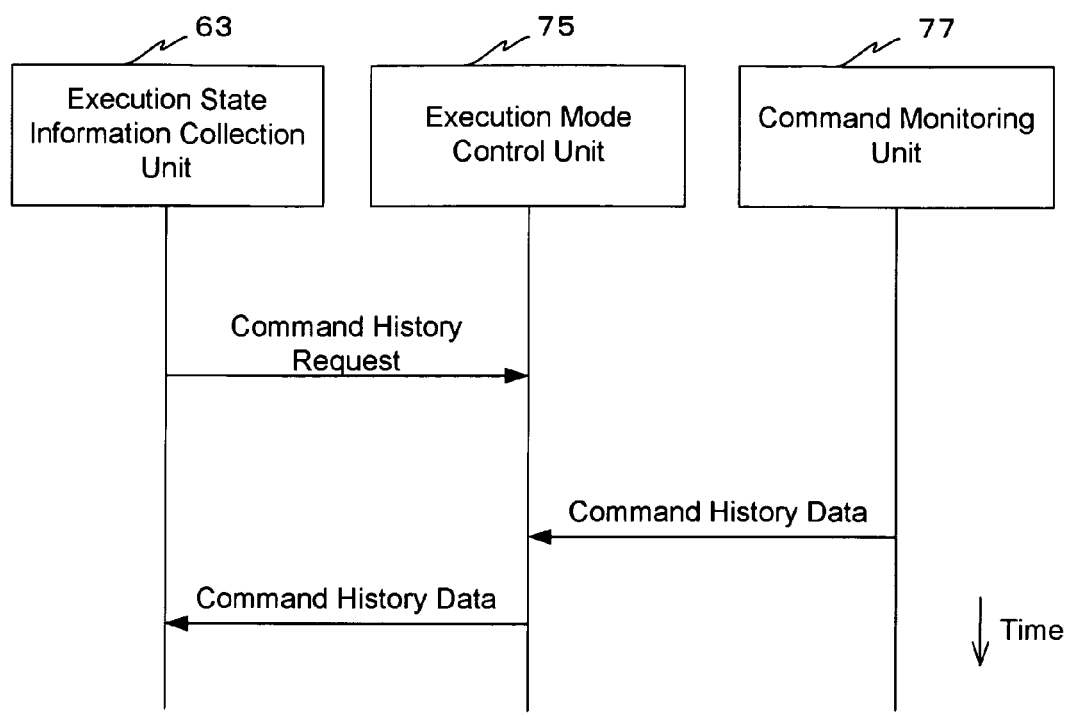
FIG. 19 is a sequence diagram for explanation of command history reading out processing.

By performing actuation of the stroke device 67 or the pointing device 68 and issuing a command history request, the developer is able to read out the command history which is buffered in the command monitoring unit with the procedure shown in FIG. 19. In this embodiment, it is arranged to perform this type of command history reading out only when the engine processor 41 stops the program execution processing.

In this command history request processing, upon receipt of the command history request by the developer which designates the amount to be read out, the execution state information collection unit 63 sends a command history request to the execution mode control unit 75 via the internal bus 69 and the bus interface unit 72, with the number of data items to be read out set as a parameter. It should be understood that, if the number of data items to be read out has not been specified by the developer, then the execution state information collection unit 63 sends a command history request to the execution mode control unit 75 with the number of data items to be read out set to 1.

Upon receipt of this command history request, the execution mode control unit 75 reads out the specified number of commands and responses from the command monitoring unit 77, in order of age. And the execution mode control unit 75 reports the results of this reading out to the execution state information collection unit 63 of the processing control unit 60, via the bus interface unit 72 and the internal bus.

Upon receipt of this report, the execution state information collection unit 63 displays the contents which have been reported upon the display device 66, and thus supplies them to the developer. As a result, the developer is able to know the commands and responses which have been exchanged between the host emulation unit 61 and the engine unit 40.

It should be understood that, if such a command history request has been received during execution operation of the program by the control procedure unit 51 of the engine processor 41, then it is arranged for the execution mode control unit 75 to make a report to the execution state information collection unit 63 only to the effect that program execution operation is taking place.

(5) Reading Out of Memory Data within the Engine Unit

With the procedure shown in FIG. 20, the developer is able to read out data which is stored in the storage unit 42 of the engine unit 40 by performing actuation of the stroke device 67 or of the pointing device 68, and issuing a memory data request. It is arranged for this type of reading out of the memory data to be performed only when the program execution processing by the engine processor 41 is stopped.

In this memory data processing, upon receipt of a memory data request by the developer in which the region to be read out is designated, the execution state information collection unit 63 sends a memory data request to the execution mode control unit 75 via the internal bus 69 and the bus interface unit 72, with the designation of the region to be read out set as a parameter. Upon receipt of this memory data request, the execution mode control unit 75 reads out from the storage unit 42 the data within the region which has been designated. And the execution mode control unit 75 reports the results of this reading out to the execution state information collection unit 63 of the processing control unit 60, via the bus interface unit 72 and the internal bus 69.

Upon receipt of this report, the execution state information collection unit 63 displays the contents which have been reported upon the display device 66, and thus supplies them to the developer. As a result, the developer is able to know the data which is stored in the storage unit 42 at the present time point.

As has been explained above, in this embodiment, the host emulation unit 61 of the processing control unit 60 sends the program under development to the program under development execution unit 70 via the internal bus 69. And the program under development is stored by the program under development execution unit 70 in the volatile storage unit 42 of the engine unit 40. Thereafter, the host emulation unit 61 sends a program execution control command to the program under development execution unit 70, via the internal bus 69. In this manner, in response to program execution control commands which are sent from the host emulation unit 61, by the engine unit 40, the engine processor 41 performs the starting, stopping, pausing, or resumption of the program under development which is stored in the storage unit 42.

On the other hand, in response to a command from the developer, the execution mode setting information for the program under development is sent from the execution mode setting unit 62 of the processing control unit 60 to the execution state information reporting unit 71 of the program under development execution unit 70 via the internal bus 69. In the execution state information reporting unit 71, this execution mode setting information is received by the execution mode control unit 75. And the execution mode control unit 75 controls the program execution operation by the engine processor 41.

As a result, the developer is able to perform debugging of the program under development, by only issuing commands to the processing control unit 60. Thus, according to this embodiment, it is possible to supply a satisfactory development environment when developing a program to be executed by the engine unit 40 of the cellular phone 10 which incorporates the host unit 30 comprising the host processor 31 and the engine unit 40 which comprises the engine processor 41 and which operates under the management of the host unit 30, without supplying any separate in-circuit emulator device to the engine processor 41.

Moreover, when program execution operation by the engine processor 41 has been stopped, the execution mode control unit 75 of the execution state information reporting unit 71 collects state information of the engine processor 41, and forwards it to the processing control unit 60 via the internal bus 69. Due to this, when the operation is stopped, the processing control unit 60 is able to obtain the state information of the engine processor 41, i.e. the contents of various types of register within the engine processor 41 and the like. And, by performing display or the like of the state information which has been obtained, the processing control unit 60 is able to supply to the developer essential information for program debugging, i.e. the state information of the engine processor 41 when the operation of the engine processor 41 has been stopped.

Furthermore, the command monitoring unit 77 of the program under development execution unit 70 collects the commands and responses which are exchanged via the internal bus 69 between the engine processor 41 and the host emulation unit 61, and stores them as the command history. And, in response to a command history request from the execution state information collection unit 63 of the processing control unit 60, the execution mode control unit 75 reports this command history to the execution state information collection unit 63. Due to this, in response to the requirements of the developer, the processing control unit 60 is able to obtain the command history, which consists of the commands and responses which have been exchanged between the engine processor 41 and the host emulation unit 61. And, by displaying this state information which has thus been obtained, the processing control unit 60 is able to supply to the developer command history information which is effective for debugging of the program under development.

Moreover, there is incorporated the dedicated television receiver 79 which is utilized during display output and audio output by the program under development, if the program under development performs at least one of display output and audio output. Due to this, it is possible to supply a satisfactory debugging environment.

It should be understood that although, in the embodiment described above, it is arranged for break point setting, single step execution, and command history request servicing to be performed only while program execution operation by the engine processor 41 is stopped, it would also be possible to arrange for at least one of these settings or request servicing to be performed even during program execution operation by the engine processor 41.

Furthermore, in the embodiment described above, the break condition at which program execution operation by the engine processor 41 is stopped was made to be of three types: an immediate stoppage command, execution of the command at the break point address if a break point setting is made, and single step execution if the single step execution setting is performed. In addition to these three types of condition, it would also be possible to set, as the break condition, writing of data to a specified address, reading out of data from a specified address, writing of some specified data to a specified address, or the like.

Furthermore although, in the embodiment described above, by accessing the storage unit 42 for debugging, it was only made possible to read out data from the storage unit 42, it would also be possible to make it possible to write data therein.

Furthermore although, in the embodiment described above, the present invention was applied to a development support device for a program to be executed upon a cellular phone, of course it would also be possible to apply the present invention to a development support device for a program which is executed upon some mobile communication terminal other than a cellular phone, provided that it is a mobile communication terminal which incorporates a host unit which comprises a host processor, and an engine unit which comprises an engine processor and which operates under the management of the host unit.

As has been explained above, the program development support device according to the present invention can be utilized during the development of a program to be executed by the engine unit of a mobile communication terminal which comprises a host unit which comprises a host processor, and an engine unit which comprises an engine processor and which operates under the management of the host unit.

What is claimed is:

1. A system comprising:
(A) a mobile communication terminal comprising:
a host unit which comprises a host processor, and, coupled thereto,
an engine unit, further comprising an engine processor and a volatile storage unit in which a program sent from said host unit is stored, said engine processor performing execution of said program stored in said volatile storage region according to a program execution control command from said host unit; and
(B) a program development support device which develops said program to be executed by said engine unit, said program development support device comprising:
a control procedure unit which, along with performing emulation of said host unit, also performs setting of an execution mode for the program under development;
wherein said system further comprising:
a program under development execution unit which is connected to said control procedure unit via an internal bus that is internal to the mobile communication terminal, and which executes the program under development;
wherein said program under development execution unit includes:
said engine processor;
the volatile storage unit which is connected to said engine processor, and in which is stored said program under development, which has been sent from said control procedure unit via said internal bus;
an execution mode control unit which controls the program execution mode by said engine processor for said program under development, according to execution mode setting information which has been sent from said control procedure unit via said internal bus; and
a bus interface unit which performs interfacing between said internal bus, and said engine processor and said execution mode control unit.

2. The system according to claim 1, characterized in that, when program execution operation by said engine processor has been stopped, said program under development execution unit collects state information of said engine processor, and forwards it to said control procedure unit via said internal bus as execution state information.

3. The system according to claim 1, characterized in that said program under development execution unit further comprises a command history reporting unit which, along with collecting commands and responses which are exchanged between said engine processor and said control procedure unit via said internal bus and storing them as command history, also sends said command history to said control procedure unit in response to a command history request from said control procedure unit.

4. The system according to claim 1, characterized in that said program under development is an application program which performs at least one of display output and audio output, and by further comprising:
a screen display means which is used by said program under development during display output; and
an audio replay means which is used by said program under development during audio output.

5. The system according to claim 1, characterized in that said setting of execution mode, there are included a setting for execution of said program under development up to a designated break point address, and a setting for execution of a single command recorded in a program address corresponding to the present value of a program counter.

* * * * *